United States Patent [19]

Farrell et al.

[11] Patent Number: 4,807,109
[45] Date of Patent: Feb. 21, 1989

[54] HIGH SPEED SYNCHRONOUS/ASYNCHRONOUS LOCAL BUS AND DATA TRANSFER METHOD

[75] Inventors: Robert L. Farrell, Portland; Alireza Sarabi, Hillsboro; Raymond S. Tetrick, Portland, all of Oreg.

[73] Assignee: Intel Corporation, Santa Clara, Calif.

[21] Appl. No.: 6,353

[22] Filed: Jan. 14, 1987

Related U.S. Application Data

[63] Continuation of Ser. No. 555,028, Nov. 25, 1983, abandoned.

[51] Int. Cl.[4] .............................................. G06F 13/40
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,810,114 | 5/1974 | Yamada et al. | 364/200 |
| 4,085,448 | 4/1978 | Kogge | 364/900 |
| 4,096,571 | 6/1978 | Vandermey | 364/200 |
| 4,204,208 | 5/1980 | McCarthy | 364/900 |
| 4,281,380 | 7/1981 | Demesa | 364/200 |
| 4,390,944 | 6/1983 | Quackenbush | 364/200 |
| 4,511,960 | 4/1985 | Boudreau | 364/200 |

*Primary Examiner*—David Y. Eng
*Attorney, Agent, or Firm*—Blakely, Sokoloff, Taylor & Zafman

[57] ABSTRACT

A high speed local synchronous bus is disclosed for coupling processors within a multi-processor system such that local memory and secondary processing resources may be accessed without impacting data traffic along the bus. The local bus employs a message control method and apparatus which includes the ability to assert a WAIT signal when the processing resource is replying to a request. By asserting the WAIT signal all other operations on the bus are delayed until the transfer is complete. The use of the WAIT signal enables a device operating at a different speed from the primary processing resource to respond across the bus in a manner that is synchronized to the clock speed of the primary processing resource.

16 Claims, 24 Drawing Sheets

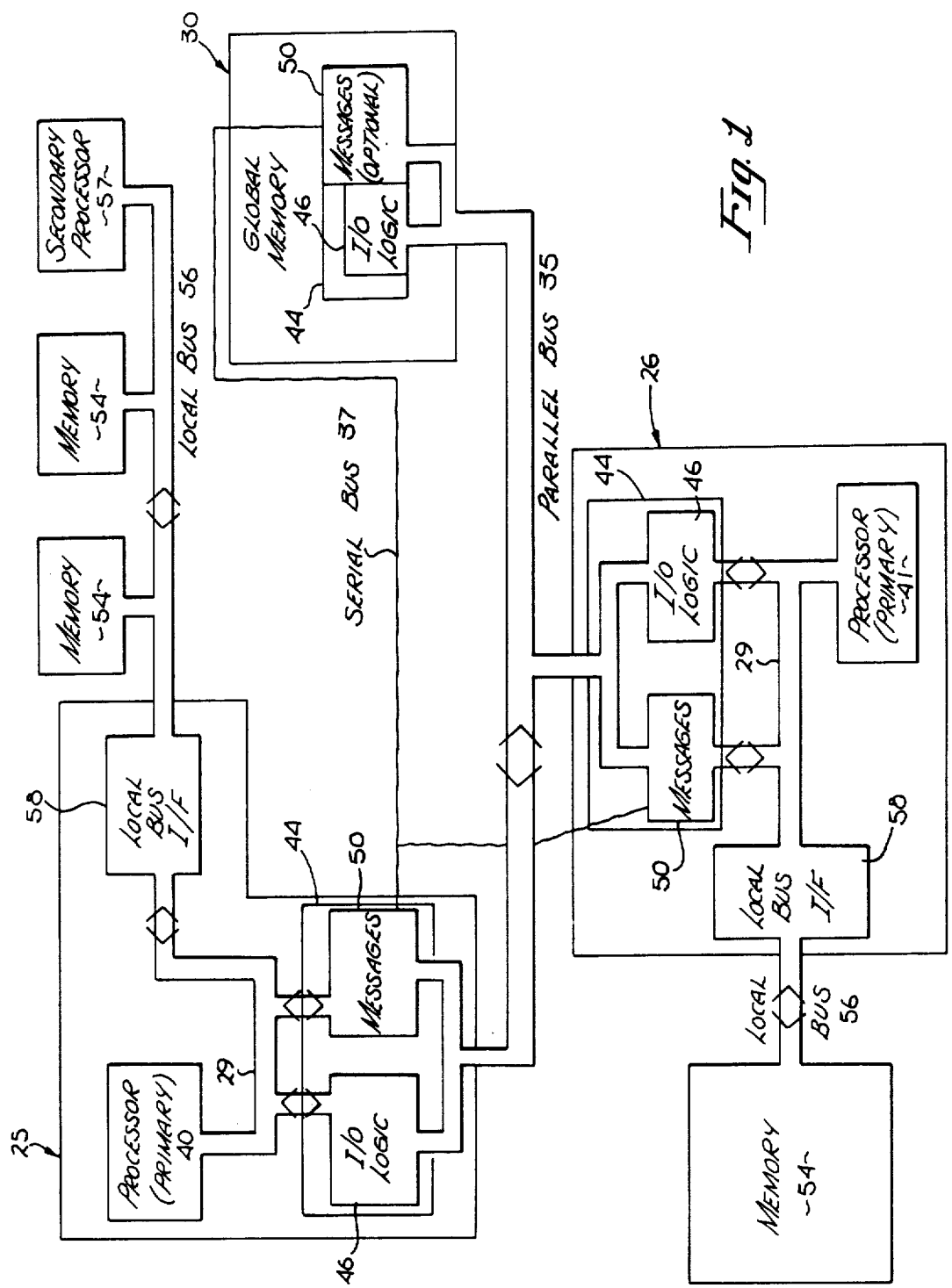

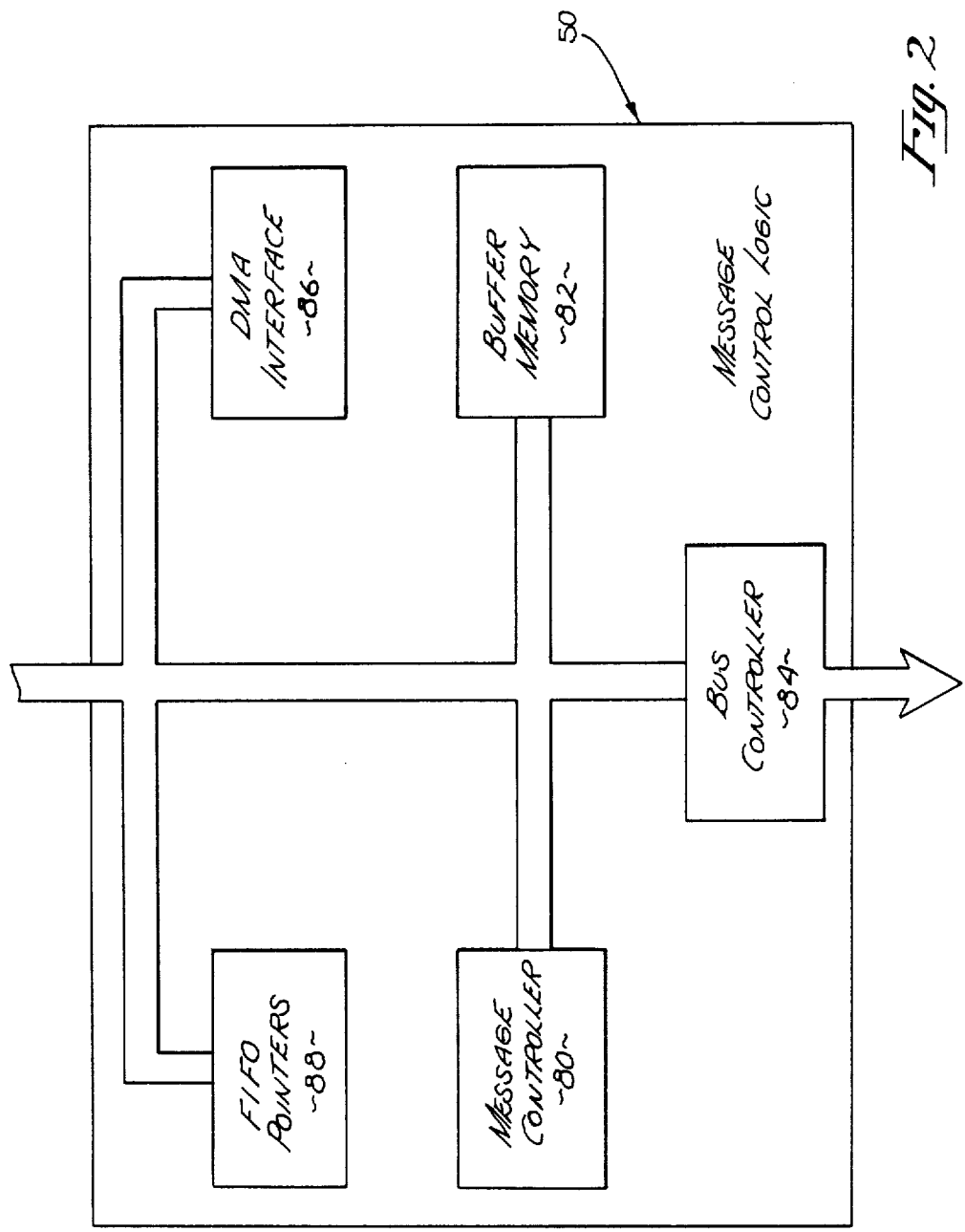

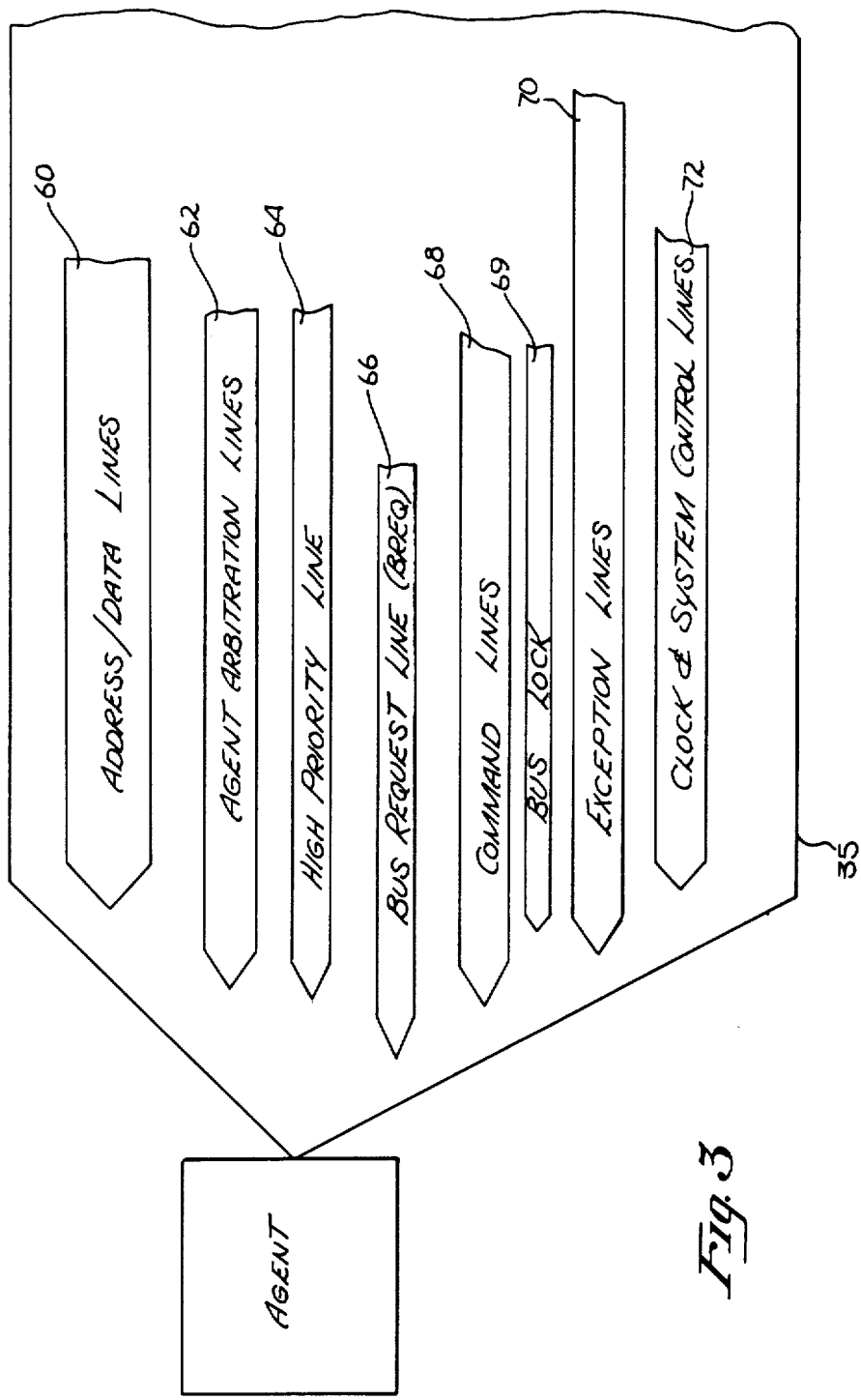

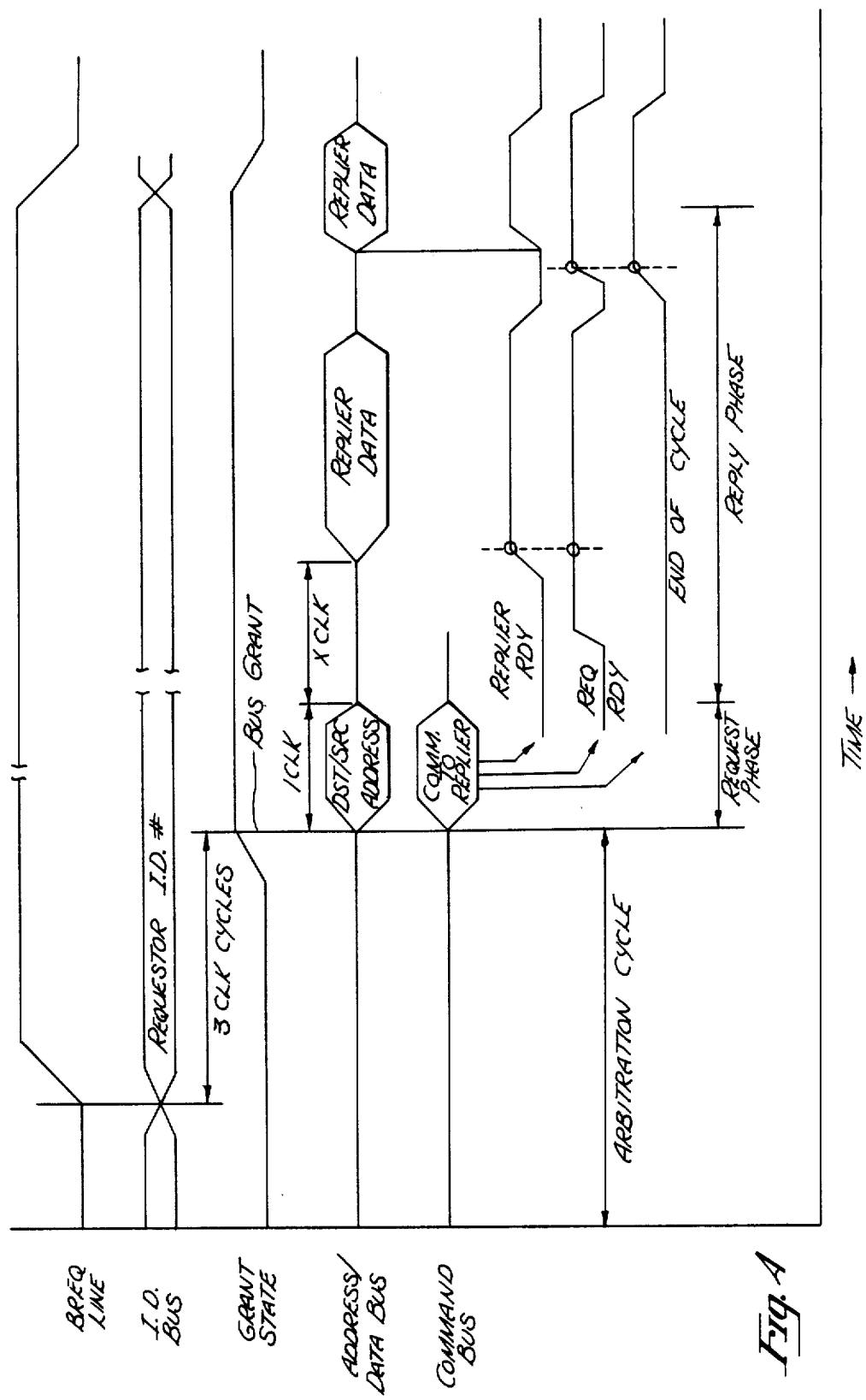
Fig. A

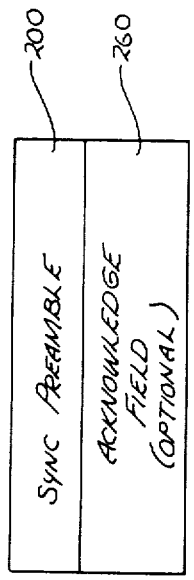
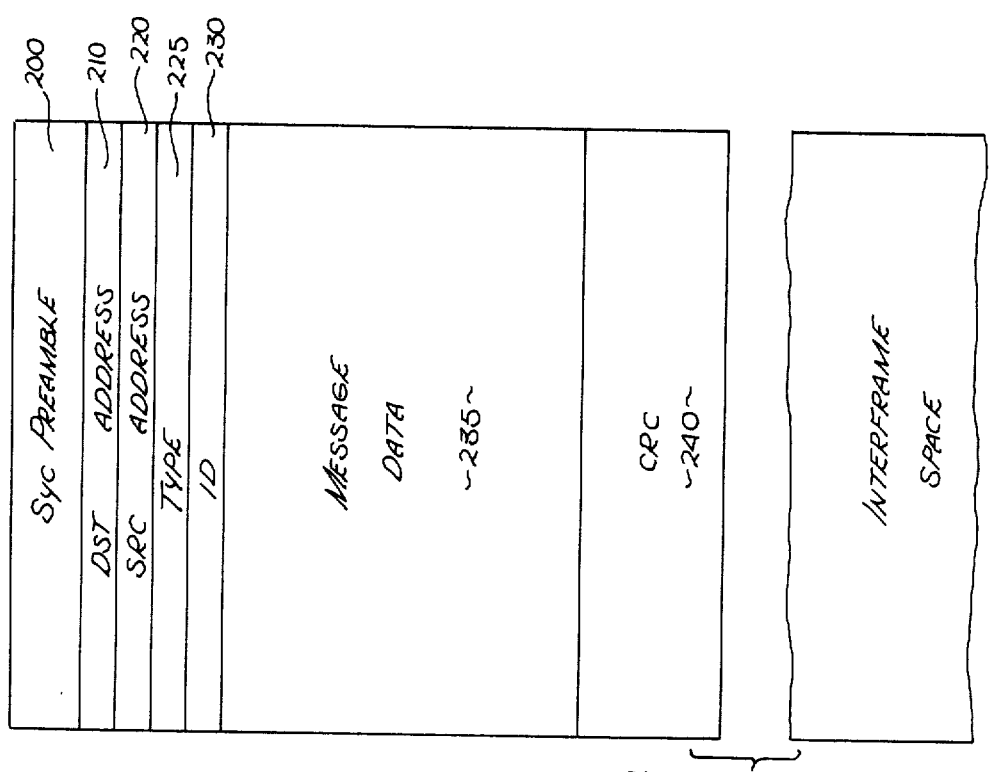
Fig. 11b
Fig. 11a

DETERMENISTIC   COLLISION   RETRANSMIT   ARBITRATION

Fig. 17  Read Access with Wait

HIGH SPEED SYNCHRONOUS/ASYNCHRONOUS LOCAL BUS AND DATA TRANSFER METHOD

This application is a continuation of application Ser. No. 555,028, filed 11/25/83, now abandoned.

BACKGROUND OF THE INVENTION

The present application has been filed concurrently with, and is related to, U.S. patent applications, Ser. Nos. 555,027, filed Nov. 25, 1983 (now U.S. Pat. No. 4,570,220) and 555,026, filed Nov. 25, 1983 (abandoned in favor of continuation in part application, Ser. No. 823,358, filed Jan. 28, 1986), and hereby refers to, and incorporates by reference the contents of the above referenced applications.

1. Field of the Invention:

The present invention relates to apparatus and methods for transferring data between a source and a plurality of receiving data processing devices. More particularly, the present invention relates to data transfer along a bus between a source and a plurality of data processing and peripheral devices using multiple bus structures.

2. Art Background:

In the computing industry it is quite common to transfer data and commands between a plurality of data processing devices, such as for example, computers, printers, memories, and the like, on a system or data bus. A data processing system typically includes a processor which executes instructions that are stored at addresses in a memory. The data that is processed is transferred into and out of the system by way of input/output (I/O) devices, onto a bus which interconnects the data processing system with other digital hardware. Common constraints on the speed of data transfer between data processing devices coupled to a bus are protocol or "handshake" restrictions which require a predetermined sequence of events to occur within specified time periods prior to actual data exchange between the devices.

Various methods have been devised in order to convey data between a data processing device and a peripheral unit which may be, for example, a memory unit, a second processor unit, a disk drive or the like. One method utilizes direct memory transfers which permits large quantities of information to be moved between a processor memory and a peripheral unit. However, one disadvantage of existing direct memory transfer system is that some processor activity is necessary for each direct memory transfer. Various instructions or other signals are required which start and stop the transfer, and the generation of these signals requires an interruption of the processor unit. In data processing systems which utilize multiple processors, a direct memory transfer between the memory of a first processor and the memory of a second processor requires complex system protocol and addressing in order to preclude ambiguity. For example, the transfer of data between a local resource memory of a primary processor A and the local resource memory of a secondary processor B along a common bus typically requires the interruption of secondary processor functions in order to access the secondary memory and initiate a data transfer along the bus to the primary processor. In addition, any overlapping of memory addresses between the primary processor's memory and secondary processor's memory further complicates the data transfer protocol in order to insure no ambiguity with respect to the contents of each memory at identically numbered address locations. Accordingly, in multiple processor data processing systems, it is apparent that proper allocation and access of system resources is vital in order to insure optimum efficiency in data transfers.

As will be described, the present invention provides a data processing system architecture which includes multiple bus structures in order to optimize data and message transfer between multiple processors, as well as an orderly allocation of system resources to all devices residing within each bus. The present invention's bus structure comprises a general purpose parallel bus, as well as specialized buses which are interconnected through system interfaces which define the communication and data transfer protocols.

SUMMARY OF THE INVENTION

A multiple bus system architecture and improved data transfer methods are disclosed for transferring data between a plurality of data processing resources. The bus structure of the present invention includes both a parallel and serial bus which interconnects data processing units and peripheral devices (collectively referred to as "agents") to permit the exchange of data and messages at high speed using a minimum of "handshake" events prior to the actual data transfer. Both the serial and parallel bus protocols are controlled by message control means coupled to each communicating agent. A local bus is coupled to processing agents within the system such that local memory and secondary processing resources may be accessed without impacting data traffic along the parallel bus. Direct access to resources coupled to the local bus of an agent from other bus agents is also controlled by the message control means.

If a requesting bus agent desires to initiate a data exchange along the parallel bus, it asserts a bus request (BREQ) signal and transmits a digital code corresponding to its unique agent arbitration number on an I.D. bus coupled to all system agents. The bus requesting agent gains parallel bus ownership if its arbitration number has the highest predetermined priority. The requesting agent then asserts the address of the replying agent along with its own address on an address/data bus, and concurrently, asserts a command to the replying agent on a command bus. The requesting agent asserts a requester ready (REQ RDY) signal when it is prepared to continue the data exchange. Similarly, a replying agent asserts a replier ready (REPLY RDY) signal when it is prepared to proceed with the data transfer. Only upon the assertion of both ready signals is data on the address/data bus considered valid. A data transfer operation is terminated by the requesting agent asserting an end of cycle (EOC) signal in connection with the REQ RDY signal.

A bus agent desiring to transmit a message to another agnet on the present invention's serial bus, encapsulates and transmits the data message through the use of its message control means after determining that the serial bus is not in use. A replying agent receiving the message transmits an acknowledge signal (ACK) to the requesting agent during a predetermined interframe period following the serial message. If a collision along the bus is detected, serial bus agents initiate a collision retransmit arbitration cycle which allocates the serial bus ownership in an equitable manner.

The present invention's local bus provides a high speed, high band width parallel bus to local memory and processing resources for the primary processor of an agent. Data is transferred between a primary (or secondary) processor and a local memory resource in accordance with local bus protocol. All events on the local bus are clocked to the primary processor's internal clock cycles. If a replying agent cannot perform the required data operation (e.g. a read or write operation) at the rate defined by the bus clock, it may assert a WAIT signal which requires that the state and information content of the local bus to be kept unchanged for the next clock cycle. The use of a WAIT signal permits replying agents to operate at a slower speed than the primary processor, by interjecting a delay while WAIT is asserted.

BRIEF DESCRIPTION OF THE DRAWINGS

FIG. 1 illustrates a data processing system adapted to implement the teachings of the present invention.

FIG. 2 is a block diagram of major components comprising the present invention's message control logic.

FIG. 3 diagrammatically illustrates the various sub-bus structures comprising the present invention's parallel system bus.

FIG. 4 is a timing diagram which illustrates the parallel system bus protocol for data transfer between agents coupled to the parallel bus.

FIG. 11(a) illustrates the present invention's data encapsulation structure for transmitting messages between agents coupled to the bus structure of the present invention.

FIG. 11(b) illustrates the acknowledge message structure used in the serial bus for acknowledging a message transfer along the serial bus.

DETAILED DESCRIPTION OF THE INVENTION

General System Description

Figure 5A:
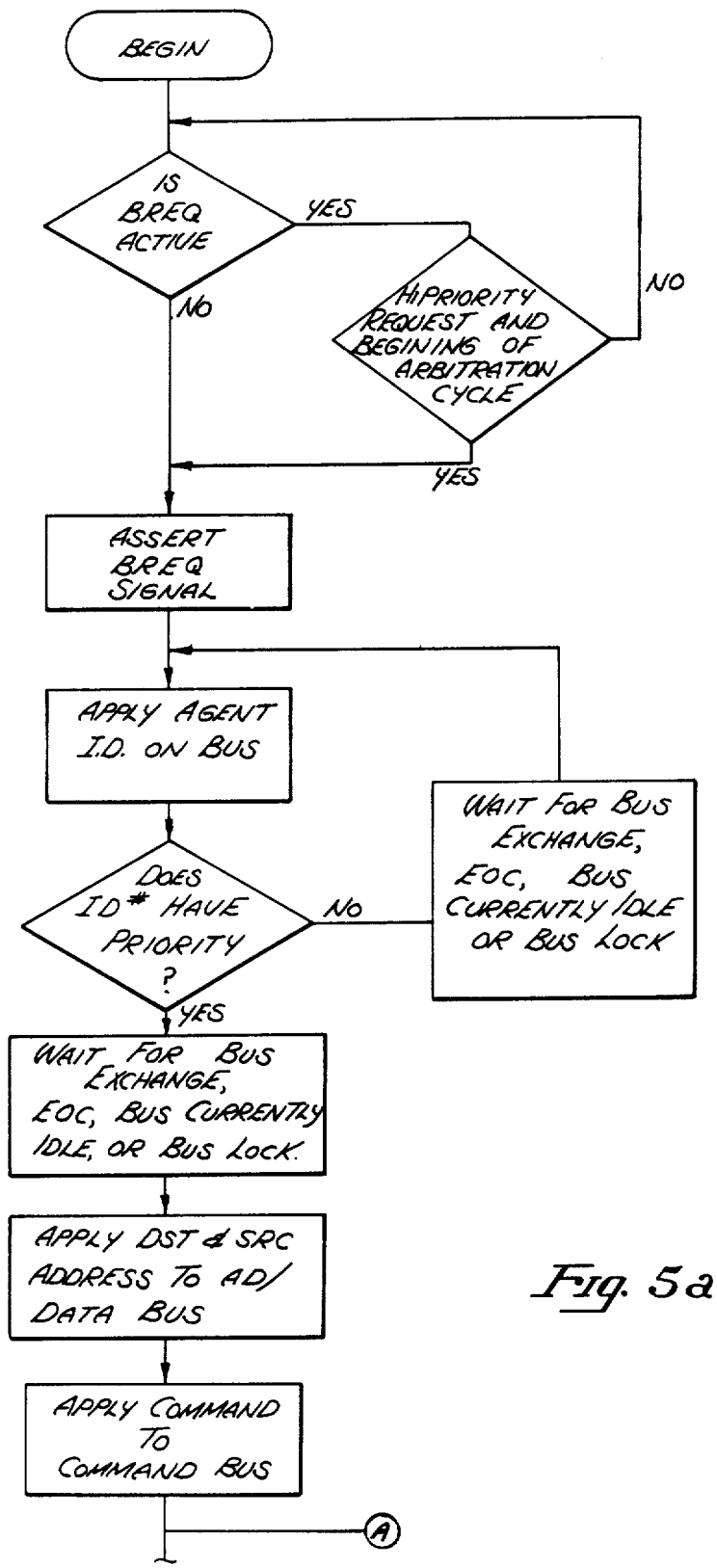
FIGS. 5(a) and 5(b) are a flow chart illustrating the sequence of operations executed by a requesting agent coupled to the parallel bus in order to receive data from a replying agent along the bus.

A multiple bus system architecture and improved data transfer methods are disclosed for transferring data between a plurality of data processing resources. In the following description for purposes of explanation, specific number, bytes, registers, addresses, times, signals, etc. are set forth in order to provide a thorough understanding of the present invention. However, it will be apparent to one skilled in the art that the present invention may be practised without these specific details. In other instances, well known circuits and devices are shown in block diagram form in order not to obscure the present invention unnecessarily.

Referring to FIG. 1, the present invention may include a plurality of processing units identified generally by the numerals 25 and 26, as well as peripheral devices such as global memory 30 (or other devices such as for example, printers, disk drives and the like). For purposes of this Specification, all data processing and peripheral devices which are coupled to the bus structure of the present invention are collectively referred to as "agents". As shown, processing units 25, 26 and global memory 30 are interconnected for data transfer to one another by a parallel bus 35 and a serial bus 37. Processing units 25 and 26 each include primary processors 40 and 41 which are coupled to the parallel bus 35 and serial bus 37 through respective bus interfacing units 44, which, as will be described more fully below, include I/O logic 46 and message control logic 50. As illustrated, each processing unit is coupled to local data processing resouces such as memories 54, or in the case of processing unit 25 a secondary processor 57 along a local bus 56. Processors 40 and 41 are coupled to their respective local resources, such as a memory 54, through a local bus interface circuit 58.

As will be described, the present invention's bus architecture permits high speed serial message transfer between all agents coupled to the bus as well as high speed data transfer in parallel between agents. Moreover, the present invention's architecture minimizes processor interruption in order to transfer data between bus agents, including access to data stored in local memories 54 which constitute a local resource for each processing unit. In addition, as will be described, data transfer protocols for both the parallel bus 35, serial bus 37 as well as the local bus 56 have been defined such that minimum handshake sequences are required in order to accomplish data transfer. Although FIG. 1 illustrates only two processor units coupled to the bus, it will be appreciated that the structure of the present invention permits a plurality of processing units and peripheral devices such as memories, disk drives, printers, and the like to be interconnected using one or all of the bus structures identified herein.

Parallel Bus

Referring now to FIG. 3, parallel bus 35 includes address/data lines 60 which in the present embodiment comprises thirty-two address data lines (plus four parity lines) onto which address and data are alternately multiplexed. In addition, parallel bus 35 includes an agent arbitration lines 62 to permit each agent coupled to the parallel bus 35 to convey a unique agent arbitration number for bus acquisition, and a high priority line 64, which as will be described, permits an agent to acquire parallel bus ownership irrespective of general arbitration protocol. Bus ownership may be maintained by the assertion of a bus lock signal on bus lock line 69, thereby effectively locking out other agents from bus acquisition. In addition, a bus request line (BREQ) 66 is provided in order to permit agents to request parallel bus control, and a command bus 68 is provided in order to permit processing units 25 and 26 to communicate commands to other bus agents. In order to denote error conditions, exception lines 70 are provided as well as clock and system control lines 72 to allow proper synchronization and control.

Parallel bus 35 supports three types of bus cycles which are initiated upon the request of an agent, such as for example processing unit 25, the "arbitration" cycle, the "transfer" cycle and the "exception" cycle. For purposes of this Specification, the arbitration cycle is defined as the parallel bus cycle in which an attempt by an agent is made to gain exclusive control of the parallel bus 35. The arbitration cycle insures that only one requesting agent may perform a data transfer cycle on the parallel bus 35 at any one time. At the close of the arbitration cycle only a single agent (e.g. processing unit 26) may utilize the parallel bus and transmit data to or from another agent. During the process of data transfer, a system error may occur which initiates the exception cycle. All three parallel bus cycles operate together in an overlapped fashion such that other agents may conduct arbitration cycles during an existing transfer cycle in order to determine which agent will have parallel bus ownership next.

As illustrated in FIG. 2, message control logic 50 includes a message controller 80 which is coupled by a conventional bus to a buffer memory 82, a bus controller 84 as well as a direct memory access (DMA) interface 86, and FIFO pointers 88. Message control logic 50 is responsible for implementing parallel and serial bus protocol, gaining access to the respective buses, and transferring data through DMA interface 86 between other agents coupled to the parallel (as well as serial) bus and memories 54 through local bus 56.

Assume for sake of example, that processing unit 25 is required to fetch data stored in global memory 30 using parallel bus 35. Processing unit 25, through its bus controller 84, must first gain access to the parallel bus 35 by initiating an arbitration cycle. As best shown in the flow chart of FIGS. 5(a) and (b), bus controller 84 within the processing unit 25 first determines whether or not the bus request (BREQ) line 66 is currently asserted. Assuming processing unit 25 does not have a high priority request, it must wait until the BREQ line 66 is not asserted before entering the resolution phase of the arbitration cycle. If the BREQ line 66 is not asserted, processing unit 25 then asserts the BREQ line 66 and concurrently applies a digital code corresponding to its unique agent arbitration number onto the agent arbitration lines 62 (see FIGS. 4 and 5(a)). Appropriate logic within the bus controller 84 of each agent coupled to the parallel bus 35 selects the arbitration number of the requesting agent which has the highest predetermined priority (assuming the high priority line 64 has not been asserted) within a fixed number of clock cycles after the arbitration cycle has been initiated. If another agent, for example processing unit 26, is concurrently requesting parallel bus acquisitions and the other agent has a higher priority arbitration number, processing unit 25 must wait for an end of cycle signal (EOC) denoting the end of a data exchange or for the bus to become idle. Similarly, if a previous bus owner has asserted the bus lock line 69, all agents coupled to the parallel bus 35 must await the deassertion (unlocking) of the parallel bus prior to gaining access, and repeat the attempt to gain access to the bus by asserting its arbitration number on agent arbitration lines 62.

In the present embodiment, priority among agents coupled to the parallel bus 35 is determined by their respective arbitration numbers. Each agent is coupled to a position ("slot") on the bus 35, and a dedicated "T" pin line is coupled to each slot position. At power-up, each agent is provided with an agent slot identification number, as well as a unique arbitration number, by a central service module (CSM) which is coupled to the bus (not shown). The central service module applies an agent slot identification number to the agent arbitration lines 62 and drives low the T pin line corresponding to the agent with whom slot identification number is to be associated. The driving of the T pin line low latches the slot identification number into registers within the agent. Similarly, the CSM applies a unique arbitration number to the agent arbitration lines 62 and drives the T pin line low corresponding to the agent with whom the arbitration number is to be associated. The driving of the T pin line high latches the arbitration number. In the present embodiment, the state of one arbitration line 62 denotes whether the number asserted on the remaining arbitration lines corresponds to an agent slot number or arbitration number. This process is repeated until all agents have been allocated their respective slot identification and arbitration numbers. It will be apparent to one skilled in the art that various other priority hierarchies may be defined between agents such as processing units 25 and 26.

Assuming that processing unit 25 has gained bus ownership (by having priority through its arbitration number), processing unit 25 becomes the bus owner and retains the bus even after the transfer is completed as long as the BREQ signal remains deasserted. Upon detecting an EOC signal or if the bus is currently idle, processing unit 25 applies a digital code corresponding to the address of the replier agent (destination address), as well as the address of processing unit 25 (source address) if the data comprises a message, to the address/data bus. Concurrently, processing unit 25 applies a digital code corresponding to the particular function to be performed by the replying agent (in the present example global memory 30) to the command bus. As shown in FIG. 4, once a requesting agent such as processing unit 25 applies the various address and command codes across parallel bus 35, the command bus lines are effectively split, permitting various acknowledged signal to be transmitted by both the requesting as well as replying agent. The application of the addresses and commands by the requesting agent (processing unit 25 in the present example) completes what is referred to as the "request phase". As shown, the actual request phase lasts only one clock cycle in the presently preferred embodiment.

Figure 5B:
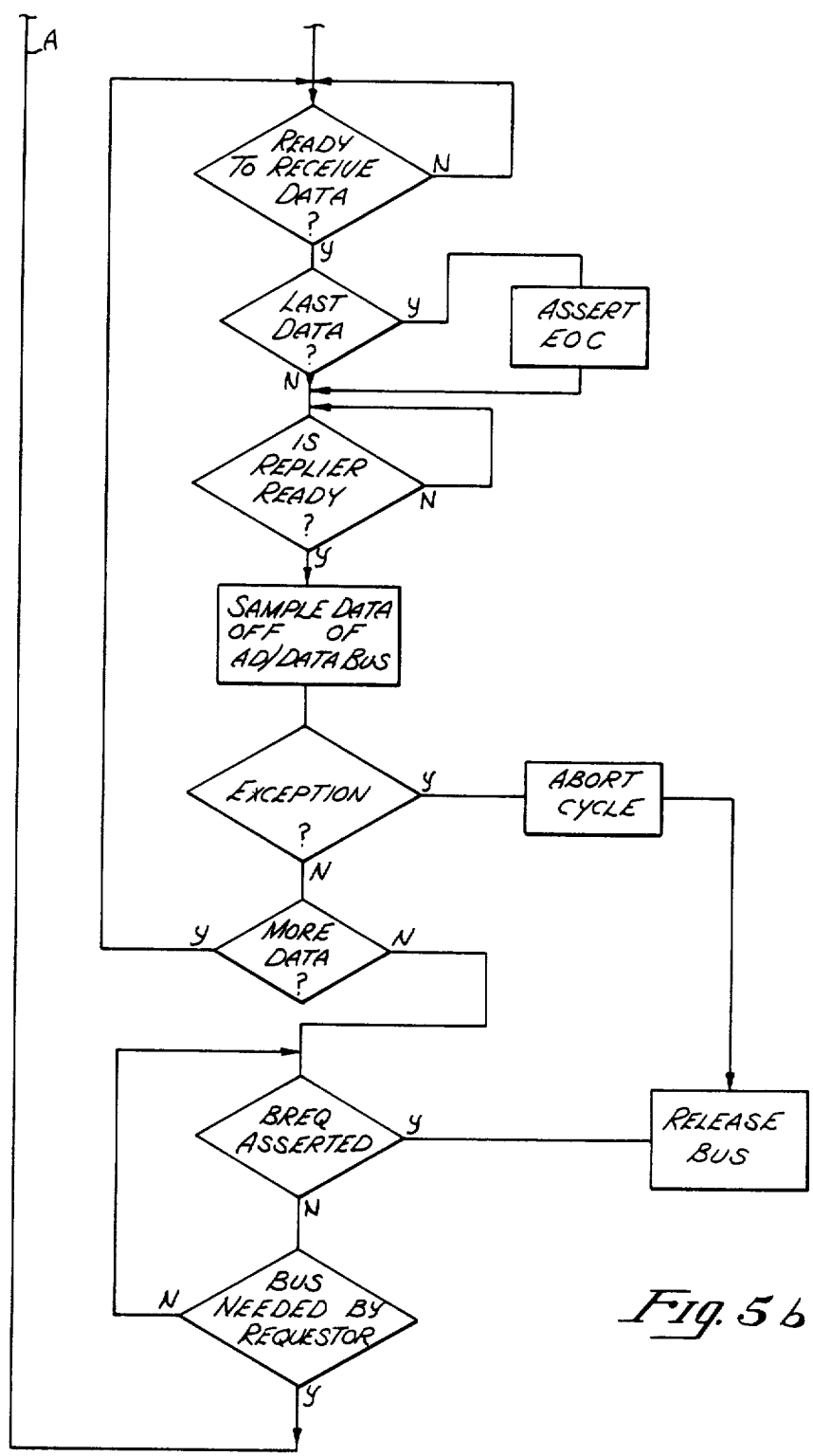
Figure 6:
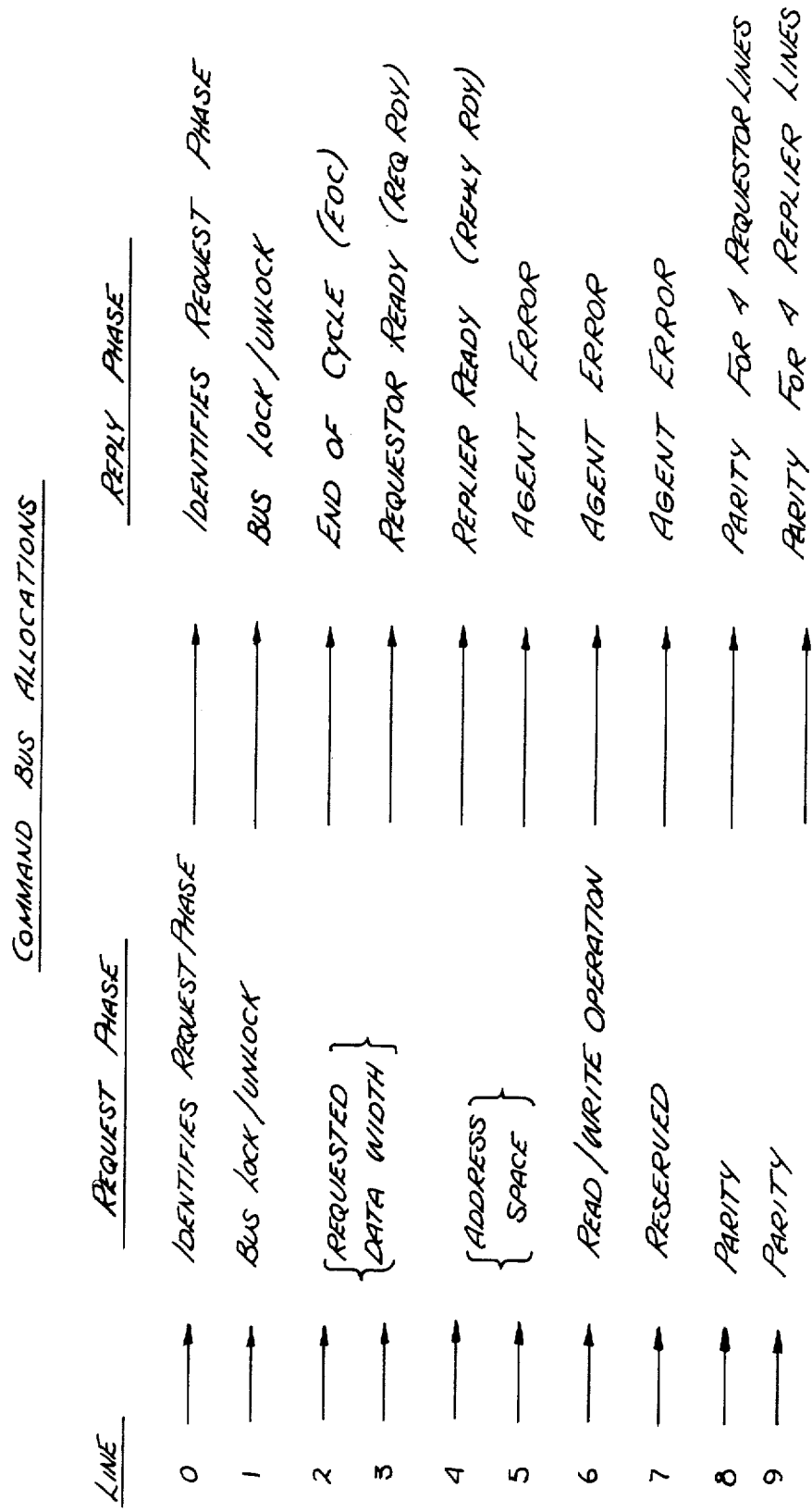
FIG. 6 illustrates the allocation of lines comprising the control bus during both the request and reply phases.

At the close of the request phase, the lines comprising the command bus 68 are reallocated as shown in FIG. 6. Specifically, five command lines are allocated to the requesting agent and five command lines are allocated to the replying agent in order to complete the handshake requires in order to transfer data between agents. In particular, the requesting agent (processing unit 25 in the present example) asserts a requester ready (REQ RDY) signal on an appropriate command line thereby indicating to the replier that the requesting agent is prepared to accept data on the address/data bus 60. Similarly, the replying agent (in the present example global memory 30) asserts a replier ready (REPLY RDY) signal (see FIG. 7) indicating to the requesting agent that data on address data bus 60 is valid and may be accepted. Thus, the protocol of the parallel bus 35 requires the assertion of both the replier and requester ready signals before data on address/data bus 60 is considered valid and latched. Additional data packets may be transmitted between the requesting and replying agents on parallel bus 35 by the subsequent deassertion of the replier ready and requester ready signals and their reassertion as illustrated in FIG. 4. As illustrated, if no further data transmission is to occur, the requesting agent (in the present case processing unit 25) asserts an end of cycle (EOC) signal concurrent with the assertion of the REQ RDY signal. The generation and transmission of the EOC signal notifies other agents coupled to parallel bus 35 of the end of the current transfer cycle such that bus ownership may be transferred. As best shown in FIG. 5(b), once valid data is sampled a replying agent (in the present example global memory 30) may signal the request agent of a data transfer error (an "exception") during its portion of the handshake normally denoted by a replier ready signal. Any data transfer cycle error detected during this period by the requesting agent (in this case processing unit 25) forces the assertion of an EOC signal on the next clock cycle, thereby aborting further data transfers and releasing bus ownership to any waiting agents who have successfully completed the arbitration cycle previously discussed.

Although the previous example and discussion illustrated a data transfer from a replying agent to a requesting agent coupled to the parallel bus 35, it will be appreciated that a data transfer from a requesting agent (e.g. processing unit 26) to a replying agent (e.g. processing unit 25) follows the substantially identical protocol as disclosed in FIG. 4, inasmuch as the present invention's parallel bus protocol simply requires the assertion of both the REQ RDY and REPLY RDY signals prior to latching data off of the parallel bus. Therefore, the present invention permits the relative operational speed of the requesting and replying agents to differ but utilize the same transfer protocol.

The present invention's message control logic 50 permits numerous message and data transfers between agents coupled to the parallel bus 35 (and as will be discussed, the serial bus 37) with minimum interruption of the primary processors within processing units. For example, data may be transferred to local processor 40 memory, or alternatively to and from A dedicated resource memory 54 without the necessity of interrupting the primary processor 40. As will be described, message controller 80 within the message control logic 50 examines message addresses passing within data packets along the parallel bus 35 as well as serial bus 37 in order to determine if the particular agent is to be involved in the message transfer operation. If a particular message controller is addressed, it examines the Type field contained within the message packet and generates any necessary interrupt required to the primary processor. Alternatively, if an interrupt is not required, appropriate information is then transferred to the direct memory access (DMA) interface 86 to permit resource memories 54 to be accessed by an external requesting agent.

Figure 7:
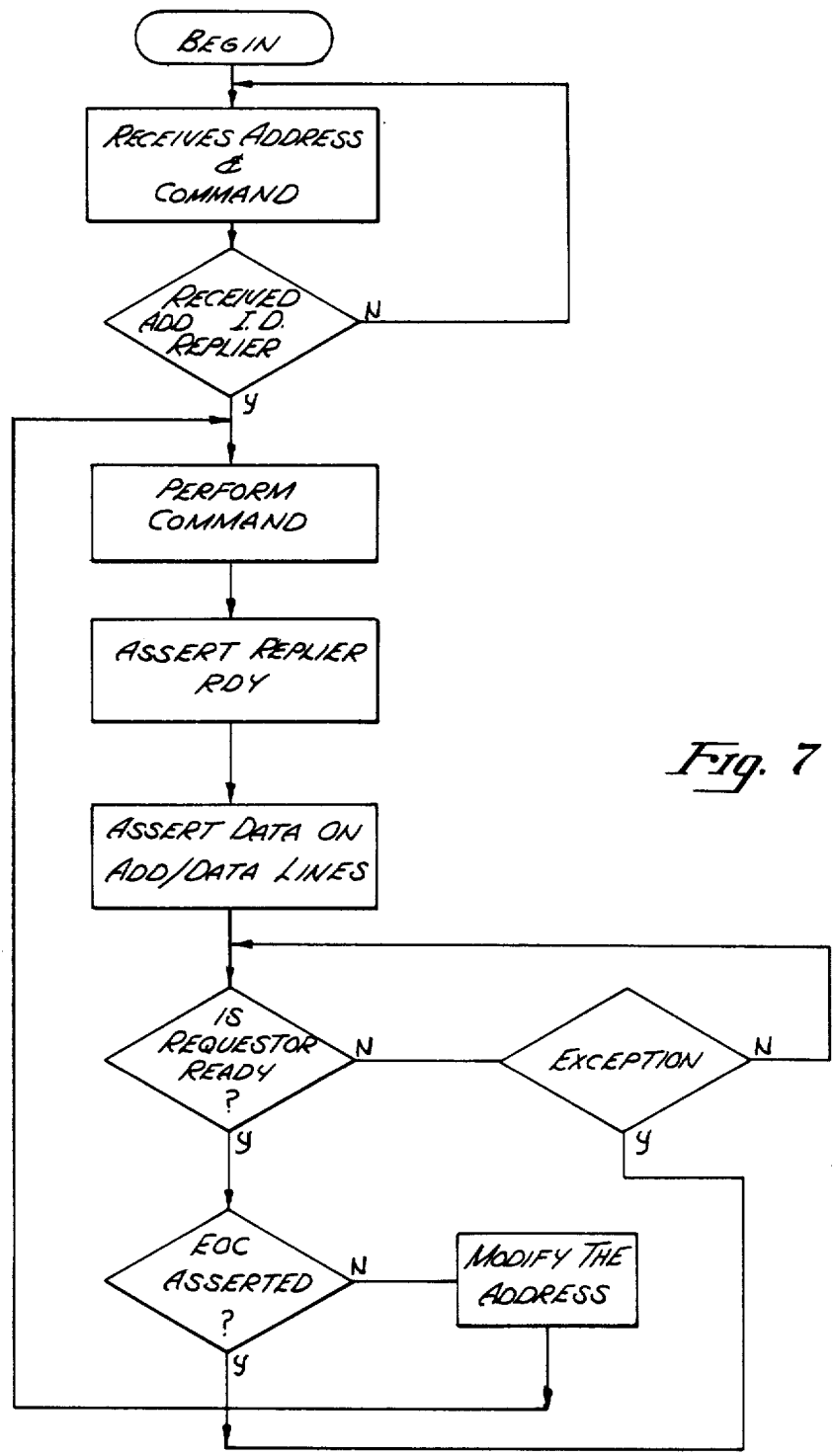
FIG. 7 is a flow chart illustrating the sequence of logical operations executed by a replying agent coupled to the parallel bus in order to transfer data to a requesting agent.
Figure 8:
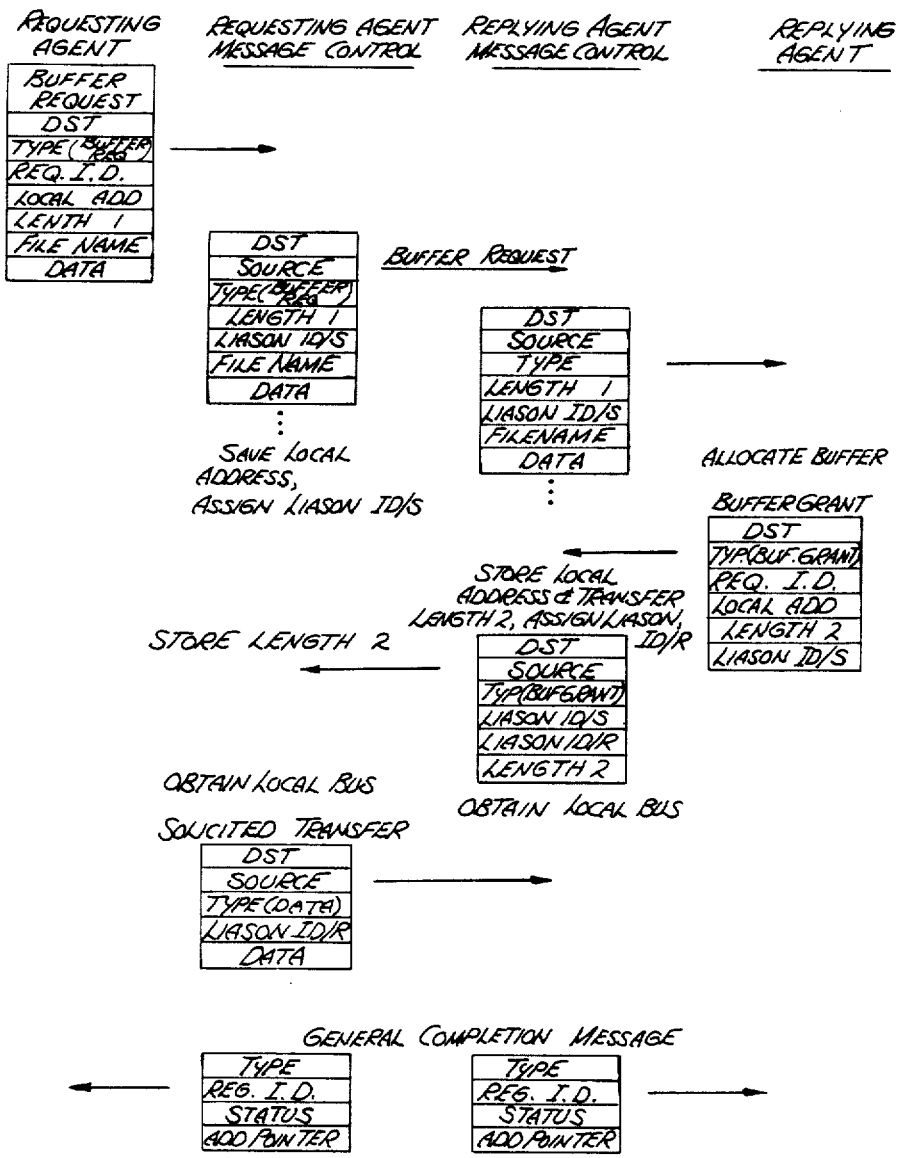
FIG. 8 diagrammatically illustrates a solicited message transfer along the parallel bus.

Referring now to FIG. 7, the message transfer operations utilizing message control logic 50 are disclosed. Assume for sake of example that primary processor 41 within processing unit 26 desires to transfer data to memory directly accessible by the processing unit 25. The requesting agent (processing unit 26) issues a "Buffer Request" to its message controller 80, which as shown, includes a destination byte corresponding to the destination replying agent's address, a command "Type" byte corresponding to a particular operation requested (in this case a write data operation), an identification byte, corresponding to the unique identification number of the requesting agent, a byte denoting the local data address where the data is stored for access by the requesting agent, an optional file name, as well as a length byte and finally any data (if data is is to be transferred). These message bytes are passed along the local internal bus 29 to the message control logic 50 of the requesting agent. The message controller 80 of the particular requesting agent (in this example, processing unit 26) stores the local address and length information within buffer memory 82 of DMA 86 of the message control logic 50. Message controller 80 additionally adds a byte to the request packet which includes a unique liason transfer number (ID/S) which identifies the current request. Message controller 80 passes the buffer request packet through bus controller 84 onto the parallel bus using the data transfer protocol previously discussed with reference to FIGS. 4, 5(a), 5(b), 6 and 7 to the replying agent (in this case, processing unit 25). The replying agent's message control logic 50 transparently passes the request to the primary processor 40 of the replying processing unit 25. Upon receiving the message the primary processor 40 of the processing unit 25 determines whether or not an appropriate memory buffer may be allocated having sufficient length as defined by the length byte "length$_1$". Once the primary processor 40 has allocated the requested memory space, a buffer grant message is generated wherein the Type byte corresponds to a unique code identifying a buffer grant. In addition, the local replying agent's address location is specified along with the allocated buffer length ("length$_2$") which indicates the memory size with the replying agent has actually allocated. This allocated memory size may differ from the memory size requested by the requesting agent. Finally, the byte denoting the liason transfer identification number (ID/S) is repeated which uniquely identifies the particular buffer request. The buffer grant data packet is then transferred along the local internal bus 29 to the replying agent message control 80 which stores the local address of the buffer as well as the transfer liason ID/S number and length$_2$ in DMA 86, and as shown, adds the liason transfer (ID/R) requester number to the generated buffer request packet. The buffer grant message is transferred to the requesting agent's message control logic unit 50 which then through the use of DMA interface 86 may fetch data to be transferred to the replying agent and pass such data to the bus controller 84 for transmittal to the replying agent in accordance with the protocol previously discussed and illustrated in FIGS. 4, 5, 6 and 7. The data transfer may consist of one or more data packets as shown in FIG. 8.

Once the desired data transfer has been completed, each respective message controller 80 for both agents generates a general completion message thereby notifying the requesting and replying agent's primary processors that the transfer has been completed. Accordingly, both messages as well as data may be transferred between agents coupled to the bus structure of the present invention with minimum interruption of primary processor operations and may include direct memory access for data transfers controlled by the message control logic 50. It will be noted that the above described message transfer operations illustrated in FIG. 8 are also utilized by the serial bus 37.

Serial Bus

Figure 9:
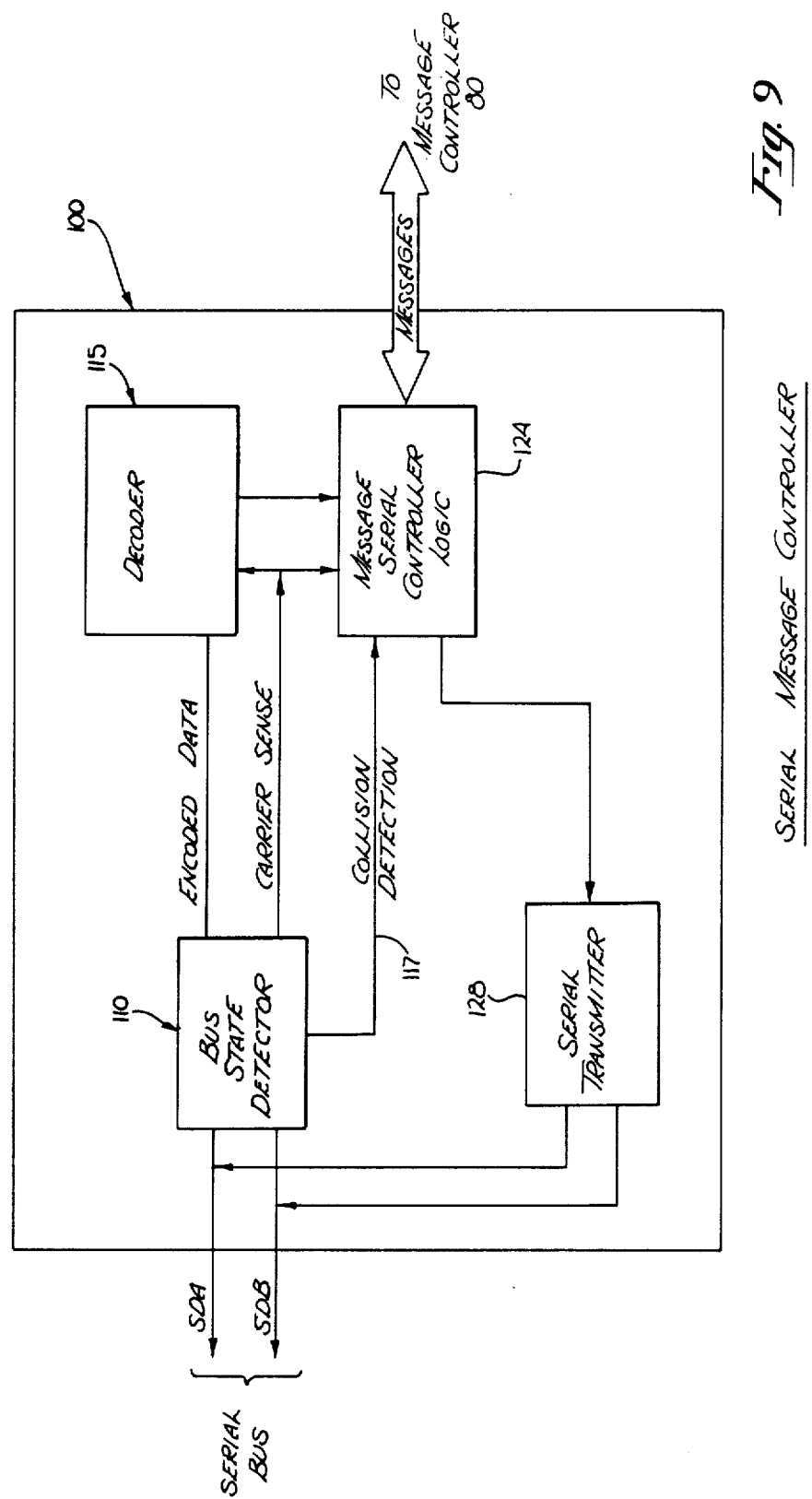
FIG. 9 is a block diagram of the primary components comprising the serial message controller for transmitting messages along the present invention's serial bus.

As previously discussed with reference to FIG. 1, each agent within the present invention's bus structure may be coupled by a serial bus 37 as well as, or instead of, the previously described parallel bus 35. While the structure and operation of the parallel bus 35, is primarily designed for large high speed data transfer between agents coupled to the parallel bus, the serial bus of the present invention is primarily designed for high speed and efficient message transfers between bus agents. In the present embodiment, serial bus 37 comprises a two wire serial link having lines identified as "SDA" and "SDB". As illustrated in FIG. 9, message controller 80 within the message control logic 50 of each agent includes a serial message controller 100 for transmitting and receiving serial data along the serial bus 37 from various agents. Both lines of the serial bus 37 are coupled to a bus state detector 110 which provies three basic signal outputs. Encoded data received from the serial bus 37 is passed to a decoder 115 along with a signal denoting a carrier sense signal. As will be described more fully below, bus state detector 110 further determines whether or not a collision has occurred between messages passing along serial bus 37. A collision detection line 117 is coupled from the bus state detector 110 to serial message controller logic 124 which, as will be described, controls the present invention's collision retransmit arbitration cycle. A serial transmitter 128 is coupled to the controller logic 124 and each serial line SDA and SDB in order to permit messages to be transmitted along the serial bus 37. As illustrated, messages to be transmitted serially along serial bus 37 are first coupled to controller logic 124 along internal message control lines (not shown) coupled directly to other message controller 80 circuitry within the message control logic block 50 shown in FIG. 2.

Figure 10:
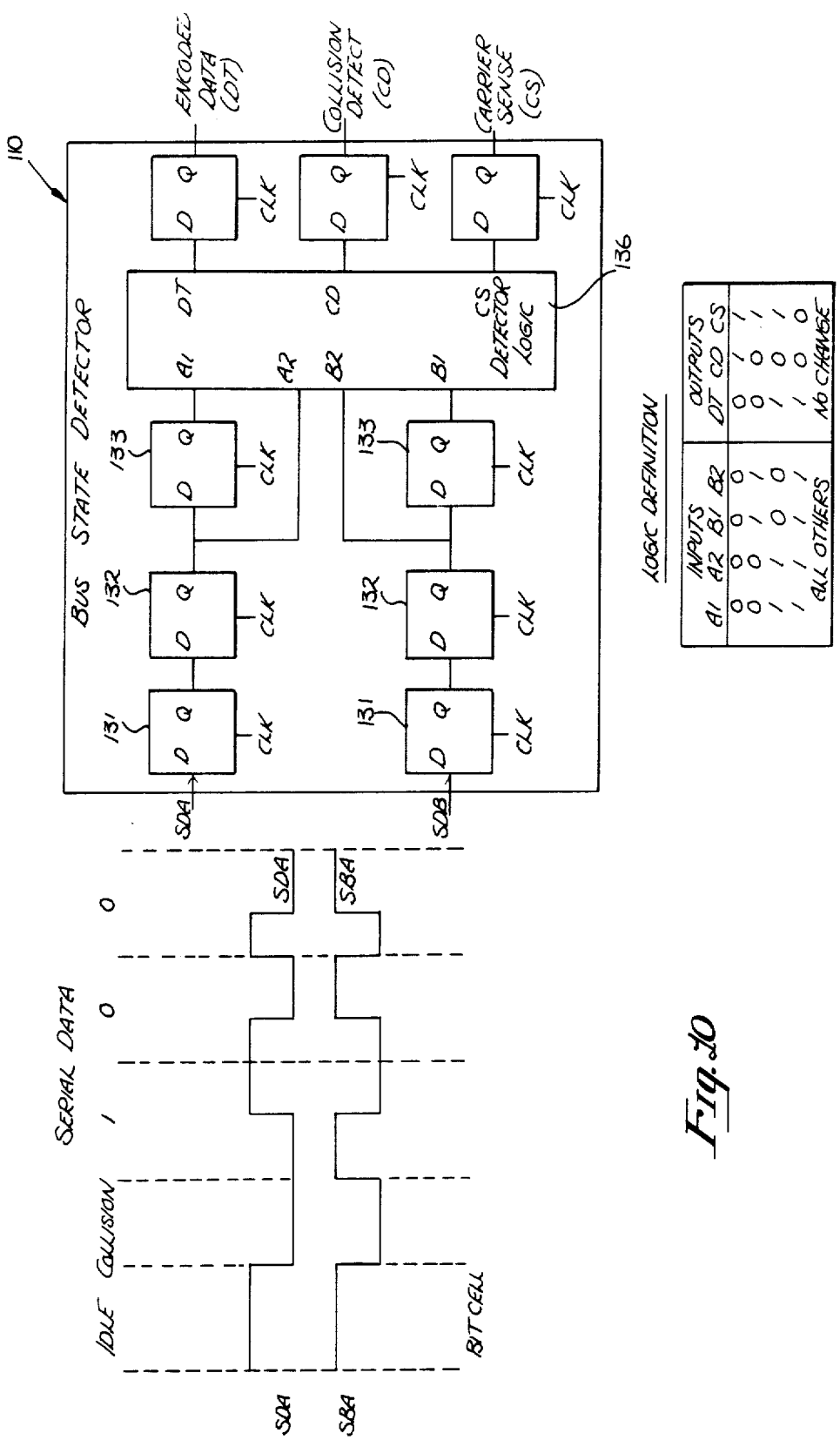
FIG. 10 is a schematic illustrating the bus state detector circuit of the serial message controller.

Data which is transmitted along the serial bus 37 is driven on lines SDA and SDB 180 degrees out of phase in the presently preferred embodiment. Moreover, serial message controller logic 124 encodes messages to be transmitted using, in the present embodiment, well known Manchester encoding techniques. Referring now to FIG. 10, bus state detector 110 generates encoded data, collision detect and carrier sense signals from received serial transmission. Bus state detector 110 includes optional "D"-latches 131 (for synchronization) which are serially coupled to a pair of similar latches 132, as shown. A third pair of D-latches 133 are in turn coupled to the output of the respective latches 132 and to a detector logic circuit 136, as illustrated in FIG. 10. The output of the D-latches 132 for both lines SDA and SDB are coupled to inputs of detector logic circuit 136 identified as A2 and B2 in the FIG. 10. Similarly, the output of D-latches 133 are coupled to inputs A1 and B1 of detector logic circuit 136. All latches are clocked simultaneously by a clock signal, typically 20 MHz, generated from the detector logic circuit 136 or an external clock. The use of the D-latches 131, 132 and 133 permits the comparison of sequential data bits which are concurrently received on lines SDA and SDB.

The present invention's bus state detector 110 provides a simple method for extracting encoded data serially transmitted along serial bus 37 as well as detecting the collisions of messages along the serial bus. As illustrated in FIG. 10, collisions along the serial data bus are easily determined by observing the output of the collision detect (CD) port of the bus state detector 110. If all inputs A1, A2, B1, and B2 of the detector logic 136 are low (a logical 0) then both lines SDA and SDB have been pulled low, thereby indicating a collision inasmuch as both data lines are normally driven by each serial transmitter 128 within the respective agents 180 degrees out of phase. Accordingly, the only instance in which all ports of the detector logic A1, A2, B1 and B2 are low would be in the case of a collision along the bus since by design the presence of a logical 1 on line SDA would necessitate the presence of a logical 0 on line SDB. Similarly, serial bus idle periods are detected by observing the output of the carrier sense (CS) port of the bus state detector 110. As shown, a bus idle period is indicated by both lines SDA and SDB being high. The carrier sense port of the detector 110 denotes an idle condition by providing a logical 0 (low) signal. Although the operation of bus state detector 110 has been described with reference to particular logical states, it will be appreciated that other combinations of logical states may equally be used.

Referring briefly to FIG. 11(a), all messages transmitted along serial bus 37 contain a synchronization ("sync") preamble 200 required for Manchester encoding, followed by a byte 210 comprising the destination agent address (e.g. processing unit 26). In addition, the source agent address 220 is provided to identify the originating agent transmitting the message. A "Type" byte 225 identifies the character of the message transmitted between the agents. Examples of type commands would include a buffer request, a buffer grant, and the like. The type byte 225 is followed by an identification (ID) byte 230 corresponding to a unique identification number for the particular transmitting agent and a data field 235. The message is terminated by a error checking CRC (16 bit CCITT) code 240, as is well known, in order to insure error free transmissions along serial bus 37. Each serial message passing along bus 37 between agents is followed by a period of no message transmissions referred to as the "interframe space" (IFS), and which in the presently preferred embodiment, constitutes approximately four byte times. All messages passed along serial bus 37 are acknowledged by the receiving agent using the acknowledgement message format disclosed in FIG. 11(b). As shown, the acknowledgement signal comprises a sync preamble 200 followed by an optional simple acknowledgement field 260 which comprises a unique digital code representing a message acknowledgement signal. In the present system, acknowledgement field 260 is not used, but rather, an acknowledgement is denoted by sync preamble 200, followed by a bus idle period within the interframe space time. If no sync preamble 200 and/or idle period is detected within the IFS time, an error is assumed.

Figure 12A:
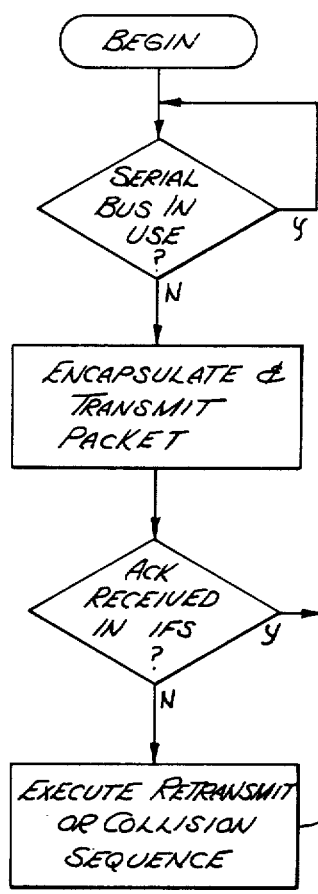
FIG. 12(a) is a flow chart illustrating the sequence of logical operations executed by a transmitting agent along the serial bus of the present invention.

Referring to FIG. 12(a), the sequence of logical operations executed by the message control logic 50 in order to transmit a message along serial bus 37 is described. Assume for sake of the example that processing unit 25 must transmit a message to processing unit 26 using serial bus 37. Processing unit 25 first determines whether or not the serial bus 37 is currently in use by examining the carrier sense (CS) output of bus state detector 110. In the present embodiment the absence of data transmissions along serial bus 37 results in both the SDA and SDB lines to remain high (see FIG. 10). A NAND operation by detector logic 136 between lines SDA and SDB would indicate a low state denoting an absence of carrier signal on serial bus 37. Once processing unit 25 determines that serial bus 37 is not in use, serial message controller logic 124 of processing unit 25 encapsulates the message using the message format illustrated in FIG. 11(a) and forwards the message to serial transmitter 128 for assertion on the SDA and SDB lines. Once the processing unit 25 has transmitted its message along the serial bus 37 it awaits the receipt of an acknowledgement message from processing unit 26 during the interframe space following the message using the format illustrated in FIG. 11(b). Assuming that the acknowledgement received within the interface space, the serial message cycle is now complete.

Figure 12B:
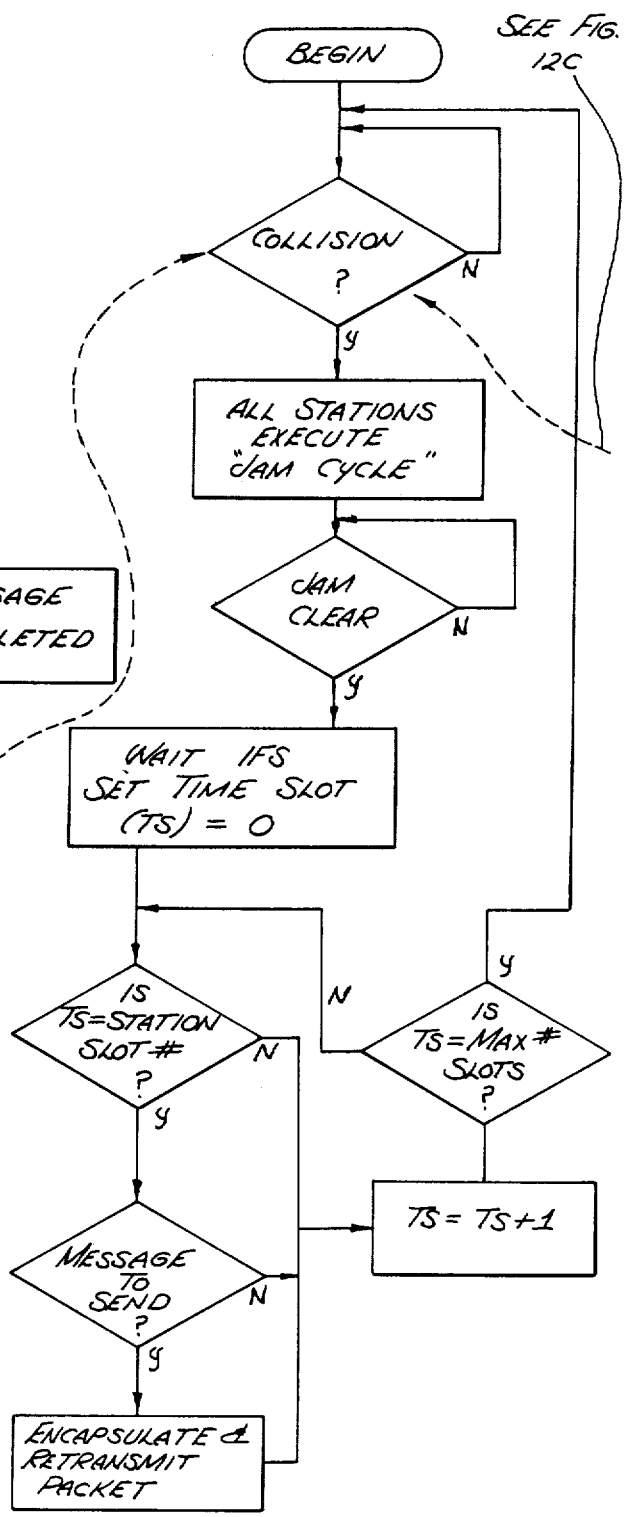
FIG. 12(b) is a flow chart illustrating the sequence of logical operations executed concurrently by agents along the serial bus to detect message collisions.

If processing unit 25 does not receive the acknowledgement message durign the interframe space, and the bus state detector 110 has not detected a collision along the serial bus 37 then the processing unit 25 proceeds to repeat the data transmission after setting a flag bit with the message type byte 225 to identify the second transmission as a duplicate message packet. If, however, bus state detector 110 has detected a collision, processing unit 25 (as well as the other agents coupled to the serial bus 37) initiates a serial bus retransmit arbitration cycle which is best illustrated with reference to FIGS. 12(b), (c) and 13.

Figure 13:
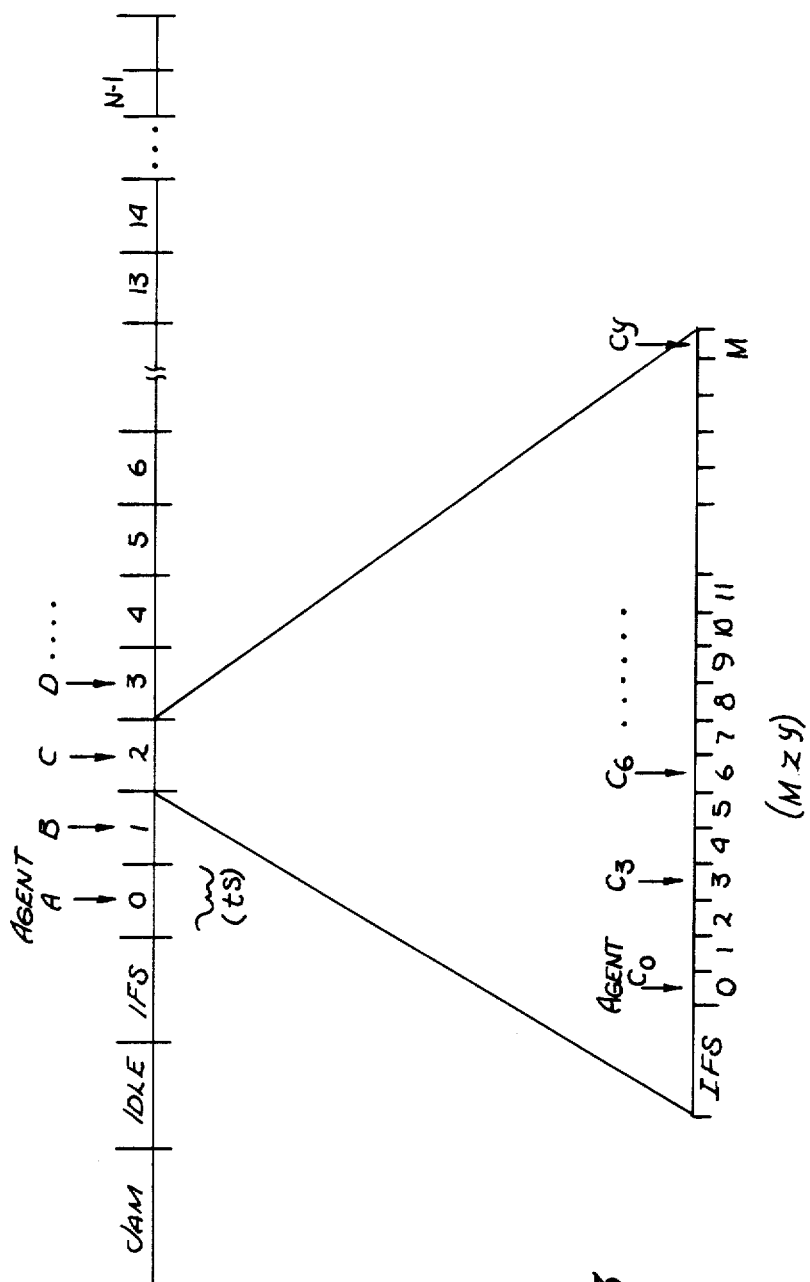
FIG. 13 illustrates the deterministic collision retransmit arbitration cycle used by the serial bus of the present invention.

Due to the nature in which data is transmitted along the serial bus, namely that the data is driven out of phase along lines SDB and SBA, the sum of the colliding messages between one or more transmitting stations will cause both lines SDA and SDB to go low. Upon detecting the occurrence of a collision, all agents coupled to serial bus 37 initiate a "jam cycle" which begins by driving both lines SDA and SDB low to "jam" the serial bus for a predetermined number of bit times. The agents then remain idle monitoring the bus state for a predetermined time to permit the collision to clear, and wait an additional period (equal to an IFS) in order to insure that a valid jam cycle has occurred. Once the jam cycle has been completed, each transmitting station simultaneously begins counting through predetermined time slots #0 through #N (as illustrated in FIG. 13).

Each agent coupled to serial bus 37 is allocated one of the unique time periods in which to retransmit its message. As illustrated in FIG. 13, each time slot may in turn be divided into a plurality of (#0–#M) of sub-time slots wherein each sub-time slot is associated with a particular agent coupled to the serial bus. In such case, upon counting up to a time slot having sub-time slot associated with it, all stations would again initiate a jam cycle and begin counting the sub-time slots within the primary time slot (time slot #2 in FIG. 13). As a result, the present invention's transmit arbitration may be efficiently used with numerous agents coupled to the serial bus 37. Although FIG. 13 has illustrated the use of sub-time slots, in the present embodiment only a single level is used such that only one agent is assigned to a particular slot.

Figure 12C:
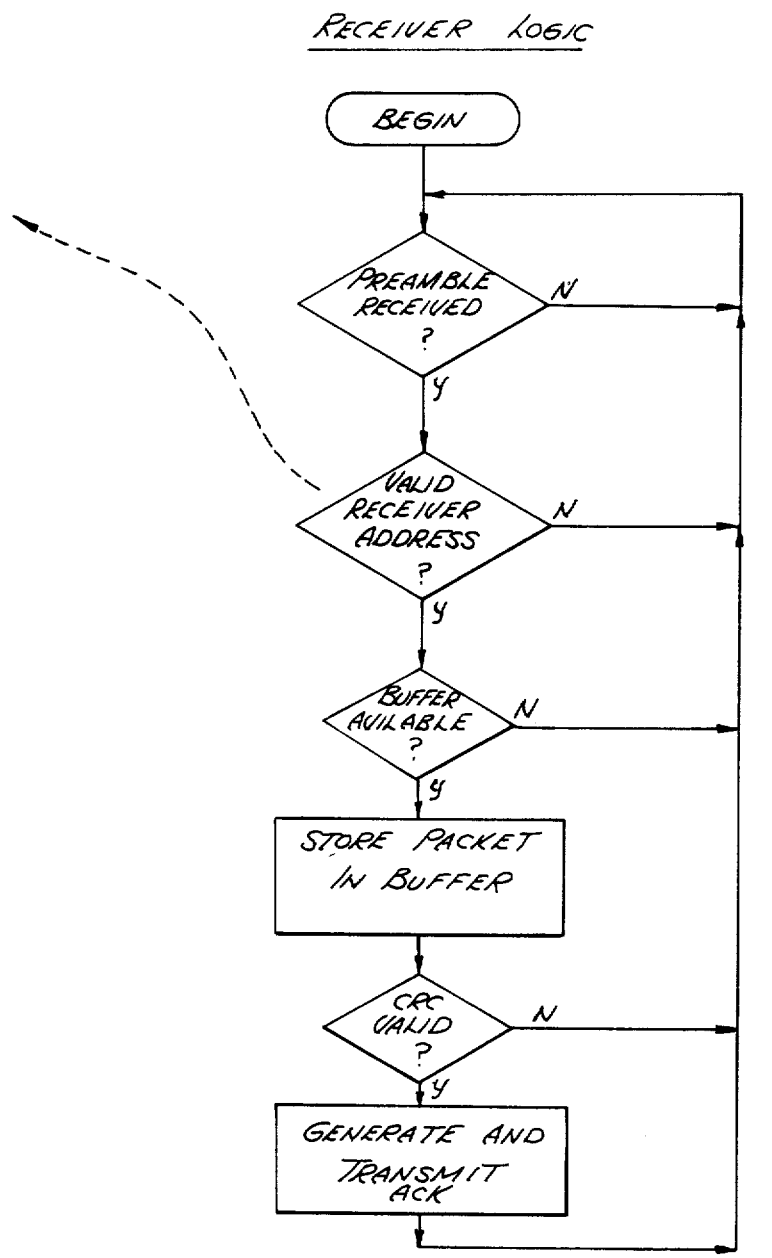
FIG. 12(c) is a flow chart illustrating the sequence of logical operations executed by agents along the serial bus to detect and receive messages.

Assume for sake of example, that a collision occurred along the serial bus 37 between messages transmitted by an agent "A" and an agent "B". After detecting the collision, all agents coupled to the serial bus 37 proceed through the jam cycle and begin the sequential counting of time slots (presently each time slot comprises approximately eight bit times) beginning with time slot #0. In the present example, agent A has been allocated time slot #0. Accordingly, all agents coupled to bus 37 cease the counting of time slots until agent A has retransmitted its data message. Once agent A has retransmited its message using the protocol identified in FIG. 12, all agents once again continue counting time slots beginning with time slot #1. (In the event that sub-time slots have been allocated, as in the case of time slot #2 of FIG. 13, sub-time slots are similarly counted down by all agents after pausing to permit agents who have been allocated the particular sub-time slot to transmit their messages.) Accordingly, the present invention's collision retransmit arbitration protocol is substantially deterministic in that each agent coupled to serial bus 37 is allocated a predetermined time slot in which to retransmit its message. This deterministic approach is fundamentally different than previous CSMA/CD protocols such as for example the "Ethernet" (U.S. Pat. No. 4,063,220) which simply requires all transmitting agents to wait some randomly weighted time prior to retransmission such that one agent will ultimately gain access to the bus.

Local Bus

The present invention's local bus 56 provides a high speed, high band-width parallel bus to local memory and processing resources for any primary processor within a processing unit such as 25 and 26, illustrated in FIG. 1. All information transfers performed on the local bus 56 involve a requesting agent or a replying agent. For example, a typical requesting agent would be primary processor 40 or a secondary processor 57 coupled to the local bus 56 for use as a resource of the primary processor 40 in performing data operations. Similarly, a typical replying agent along local bus 56 would be a memory resource 54. Accordingly, local bus 56 permits the use of multiple dedicated data processing resources between the primary processor agent 40, and a second processor agent 57 if coupled to the local bus 56. In the presently preferred embodiment, a maximum of two "requesting agents" (processors) may be coupled to the local bus 56 at any one time.

Figure 14:
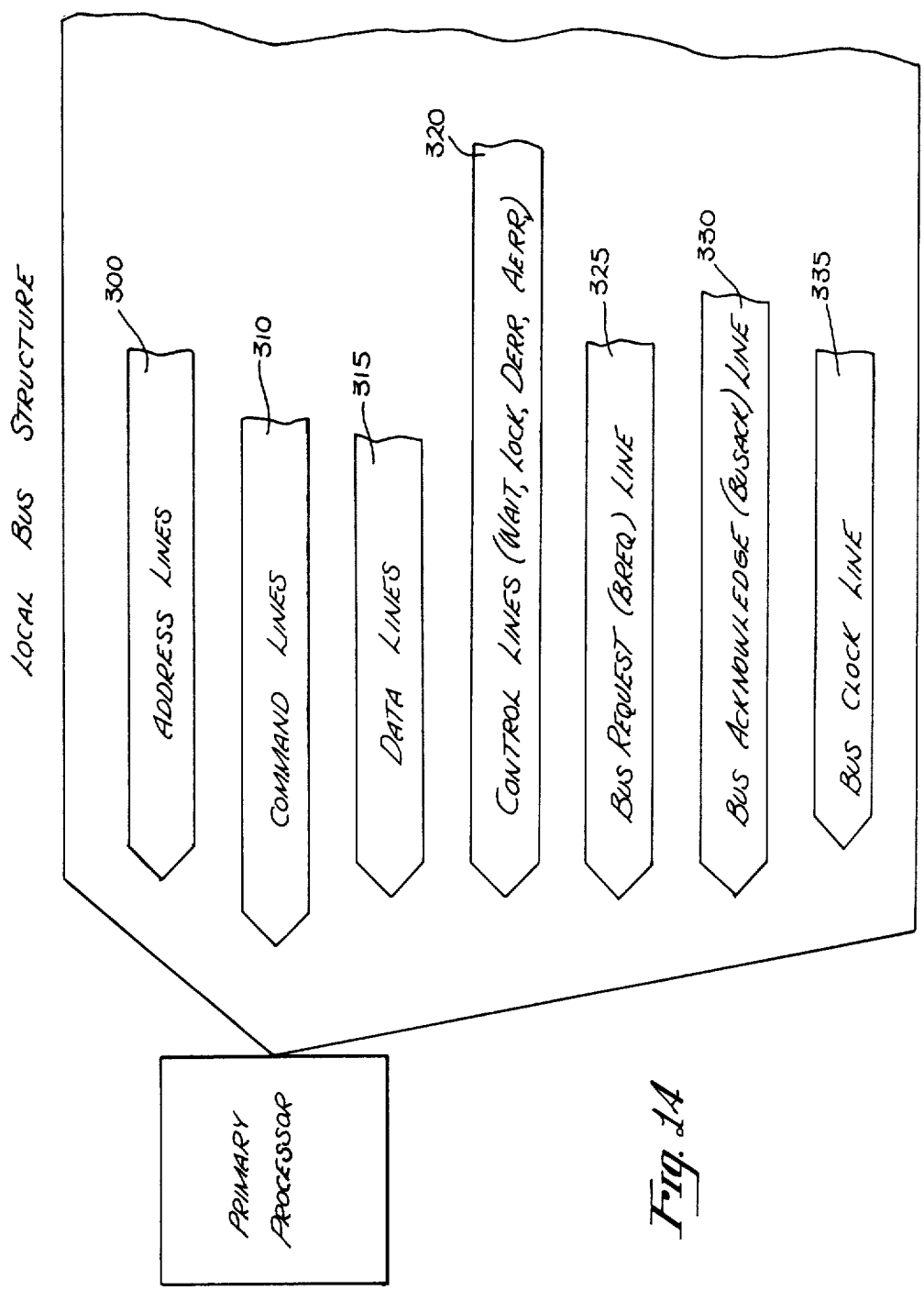
FIG. 14 diagrammatically illustrates the various sub-bus structures comprising the local bus of the present invention.

As illustrated in FIG. 14, local bus 56 includes address lines 300, command lines 310, data lines 315 and a plurality of control lines 320 to maintain system control in accordance with the protocol for local bus 56. A bus request line (BUS REQ) 325 is coupled between the secondary requesting agent 57 and the primary requesting agent 40 (in the case of processing unit 25) through the local bus interface 58 (see FIG. 1). Similarly, a bus acknowledge (BUS ACK) line 330 provides signals between the secondary requesting agent 57 and the primary requesting agent 40 to denote the acknowledgement of a bus ownership transfer. Bus clock line 335 is coupled to the primary requesting agent such that the local bus 56 may be synchronous with the primary processor's internal clock. Accordingly, all bus events are defined in terms of integer multiples of the bus clock's period, and the start and end of each event, or its duration of validity, has a defined relationship to the edge of the bus clock's signal.

All bus data transfer operations consist of three types of events referred to as cycles; the "arbitration" cycle, the "transfer" cycle and the "exception" cycle. The arbitration cycle insures that one end and only one requesting agent (either the primary or secondary processor) is allowed to initiate a data transfer along the local bus 56 at any given time. In the present embodiment, the primary requesting agent 40 is given control of the local bus 56 in the absence of a bus request by the secondary requesting agent 57. Accordingly, the primary requesting agent 40 need only enter the arbitration cycle if secondary requesting agent 57 is coupled to the local bus, and where the local bus is currently busy under the secondary requesting agent's control (note that processing unit 26 of FIG. 1 does not incorporate a secondary processor on its local bus such that its primary processor would never have to arbitrate for bus ownership).

Figure 15:
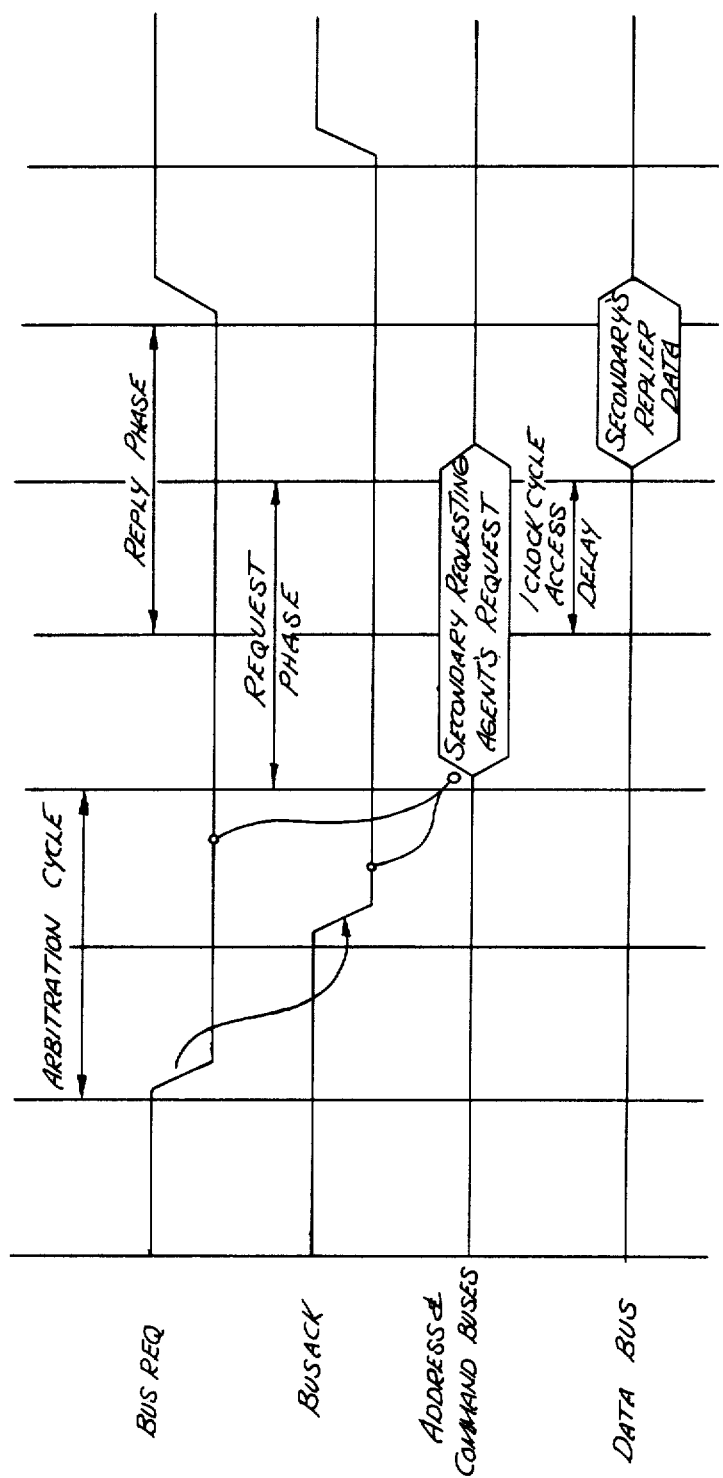
FIG. 15 is a timing diagram illustrating the arbitration cycle for gaining access to the local bus of the present invention.

Referring now to FIG. 15, the present invention's local bus arbitration cycle is illustrated. If the secondary requesting agent 57 requires the use of local bus 56, it asserts a bus request (BUS REQ) signal on the bus request line 325. The primary requesting agent 40 acknowledges the secondary requesting agent's bus request by generating a bus acknowledge (BUS ACK) signal on the bus acknowledge line 330, which effectively transfers bus ownership to the secondary requesting agent 57. Seconary requesting agent 57 may then issue appropriate address and command signals on the address lines 300 and command lines 310 to a local bus resource such as memory 54 in order to initiate the particular bus operation required. The assertion of address and command information by a requesting agent (processor) is referred to as the "request phase", and presently lasts at least two clock cycles. The replying agent (for example a memory resource 54) may then assert appropriate data (in the event of a "read" operation) on the data lines 315 for receipt by the secondary requesting agent 57, using the protocols which will be described. The secondary requesting agent 57, upon completion of the requested operation by the replying agent, deasserts the bus request line 325 thereby surrendering bus ownership back to the primary requesting agent 40.

Figure 16:
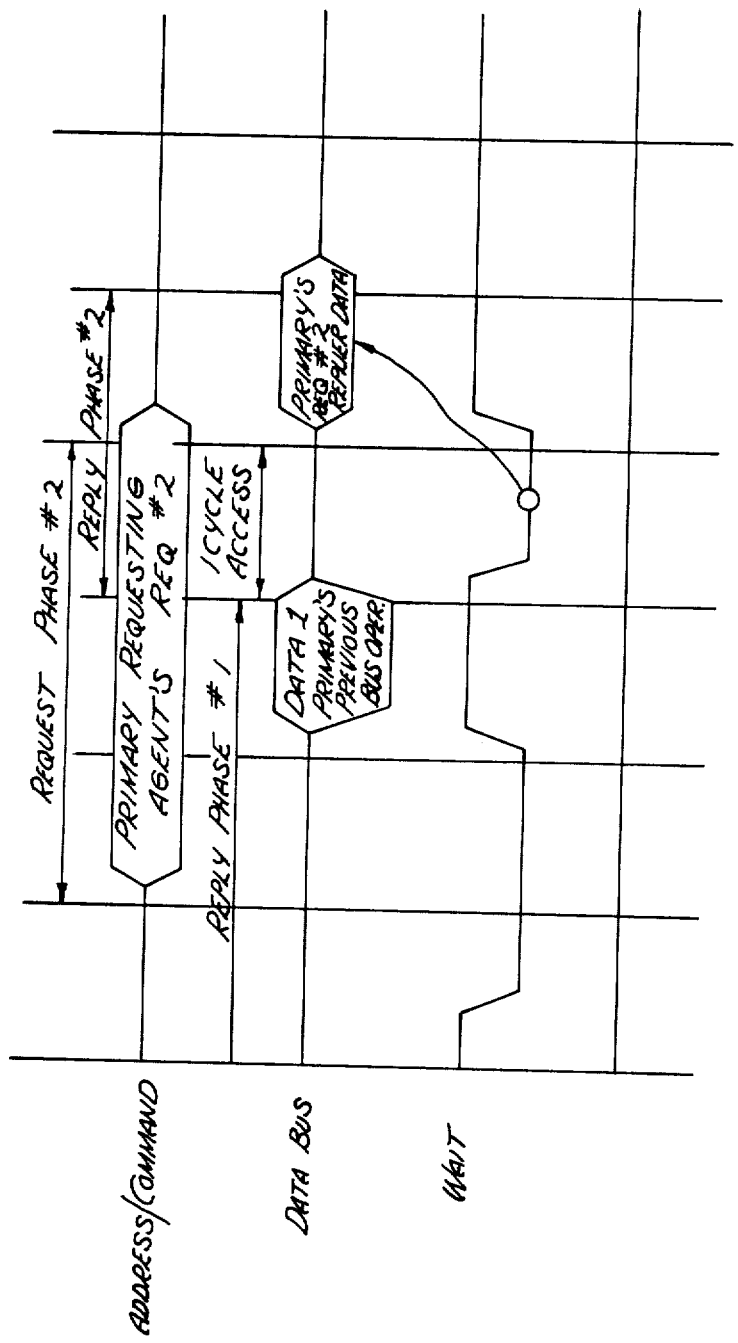
FIG. 16 is a timing diagram illustrating the local bus use of WAIT.

Referring now to FIG. 16, the present invention's unique use of a WAIT signal is illustrated. The WAIT signal may be used by all replying agents coupled to the local bus 56 to require that the reply phase be extended by injecting delay clock cycles. When pipelining is performed (the request phase of a current bus operation overlapped with a previous bus operation's reply phase), the assertion of the WAIT signal by the replying agent servicing the previous bus operation may cause extension of the current bus operation's request phase. As shown in FIG. 16, the primary processor 40 has asserted a request (using address lines 300 and command lines 310) to a replying agent coupled to the local bus 56. The replying agent servicing the previous bus operation has asserted, during the first clock cycle of the request phase of the current bus operation, a WAIT signal, which indicates to the primary requesting agent 40 that the replying agent servicing its previous bus operation was not able to receive the address and command information during the current bus clock cycle. If the addressed replying agent requires additional time in order to access and provide the requested data on the local bus, it must assert WAIT on the last clock cycle of the request phase. The requesting agent must continue asserting the WAIT signal until the appropriate number of access delay cycles have been injected. The use of the WAIT signal in order to effectively provide delay cycles in the local bus 56 would be common in the case where primary processor 40 is operating at a speed which is faster than the access time of, for example, a local memory resource 54, inasmuch as it will be recalled that local bus 56 is clocked at the same rate as the primary processor 40.

As shown in FIG. 16, the assertion of the WAIT signal in the first clock cycle of the request phase, results in the continued assertion of the primary requesting agent's request phase for an additional two clock cycles. Thus, the WAIT signal effectively interjects a delay into the state of the local bus lines but does not alter the local bus standard protocol. Although every request on local bus 56 is asserted for a minimum of two clock periods, a replying agent may respond to the request anytime after its receipt. In other words, a replying agent may respond as fast as one clock cycle after the assertion of a request (zero cycle delay), even though the requesting agent (the primary or secondary processor) is still asserting the request.

It will be noted, that the assertion of a WAIT signal after the first clock cycle of a request phase (i.e. during its second clock cycle) will have no effect on the particular request phase, and only affects the reply phase by extending it through the injection of delays. For example, as illustrated in FIG. 16, the request phase of the primary requesting agent's second bus operation begins during the clock cycle in which the reply phase of a previous bus operation was to be completed. If a WAIT signal has caused the reply phase of the previous bus operation to be delayed an additional one or more clock cycles, the request phase of the second bus operation will correspondingly be extended. An assertion of WAIT during the first clock cycle of the reply phase (the last clock cycle of the request) results in a delay in the replying agent's response until the clock cycle that the WAIT signal is deasserted by the replier. In the present embodiment, only the current replier has the right to assert the WAIT signal during a given bus operation's reply phase.

Figure 17:
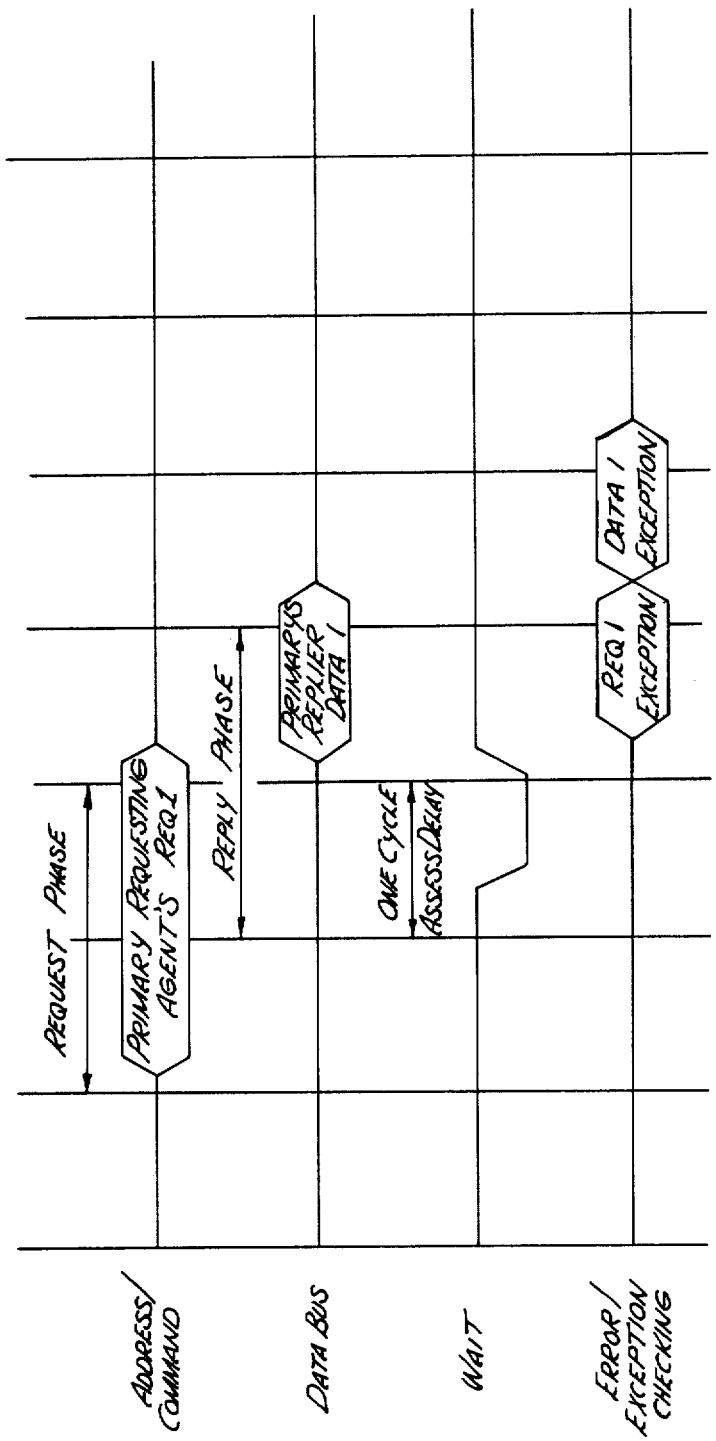
FIG. 17 is a timing diagram illustrating a local bus read access with WAIT and exception conditions.

FIG. 17 illustrates the use of the WAIT signal by a replying agent during the reply phase, as well as the present invention's exception cycles. As shown, the primary requesting agent has asserted a request (address and command information) on the address lines 300 and command lines 310. Since there was no WAIT signal asserted during the first clock cycle of the primary processor's request, the request phase lasted only for the minimum two clock cycles. The replying agent in response to the request asserted the WAIT signal during the first clock cycle of the reply phase (last clock cycle of the request phase), thereby notifying all bus agents that the requested bus operation will not be performed until WAIT is deasserted, and that all other bus functions will be delayed accordingly. In the present example, the replying agent required only a one cycle access delay in order to obtain data to be read by the primary requesting agent, and deasserted WAIT concurrently with the application of its reply on data lines 315. The deassertion of WAIT during the reply phase either signals the requesting agent that the read data on the local bus is valid and may be sampled, or that the "write data" driven by the requesting agent is sampled and the write operation is completed by the replying agent.

As illustrated in FIG. 17, a replying agent must notify the requesting agent (processor) of any errors or exceptions related to the issued request phase during the first data transfer period of the reply phase. In other words, in the presently preferred embodiment, any exceptions to a request are reported during the first data transfer period of the reply phase. In the event WAIT is not asserted during the last clock cycle of the request phase, an exception to this request phase is reported in this last clock cycle. Exceptions to data are reported during the clock cycle immediately following the application of data on data bus 315, as shown in FIG. 17.

Figure 18:
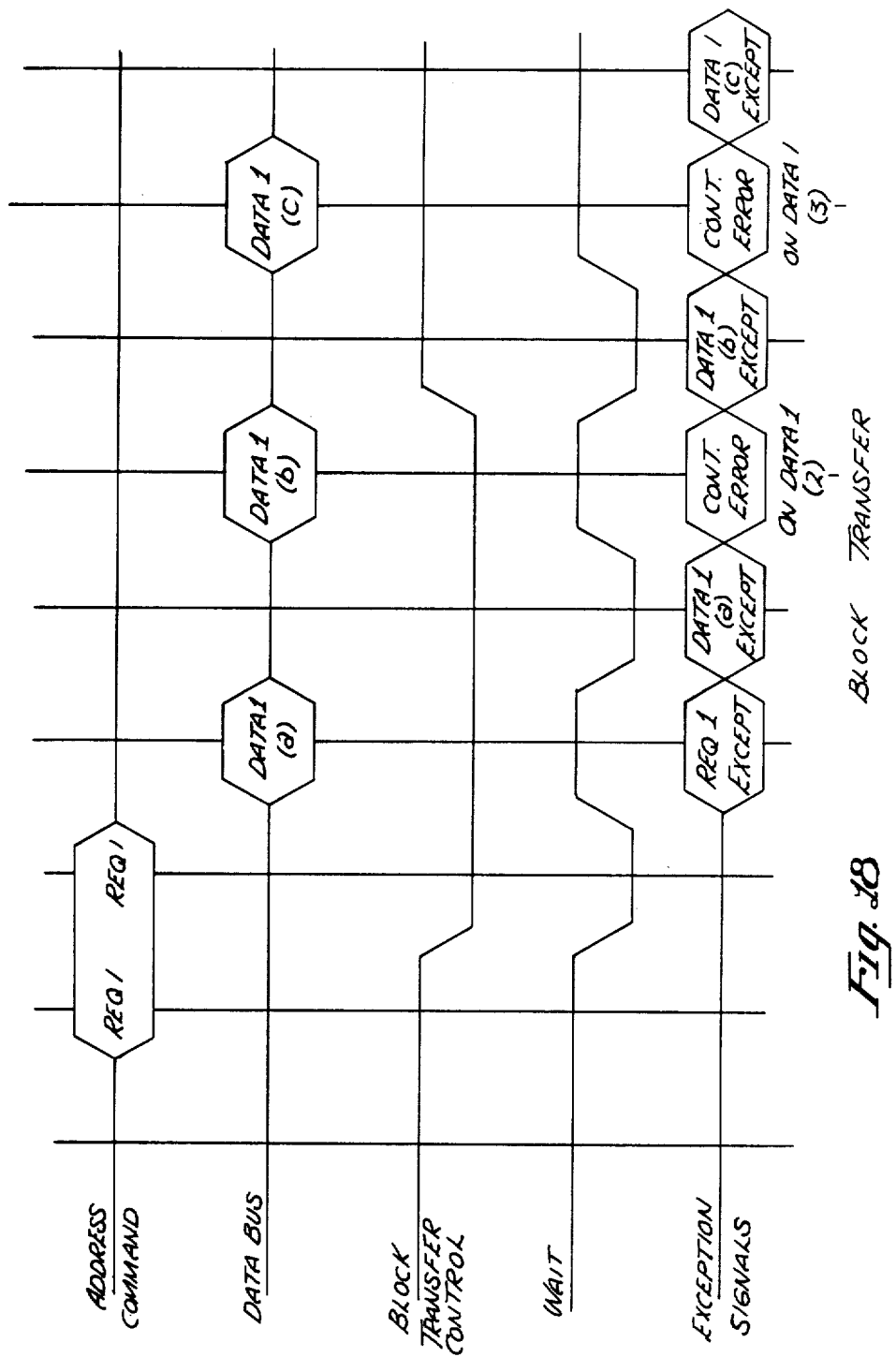
FIG. 18 is a timing diagram illustrating local bus block transfer and continuation error reporting.
Figure 21:
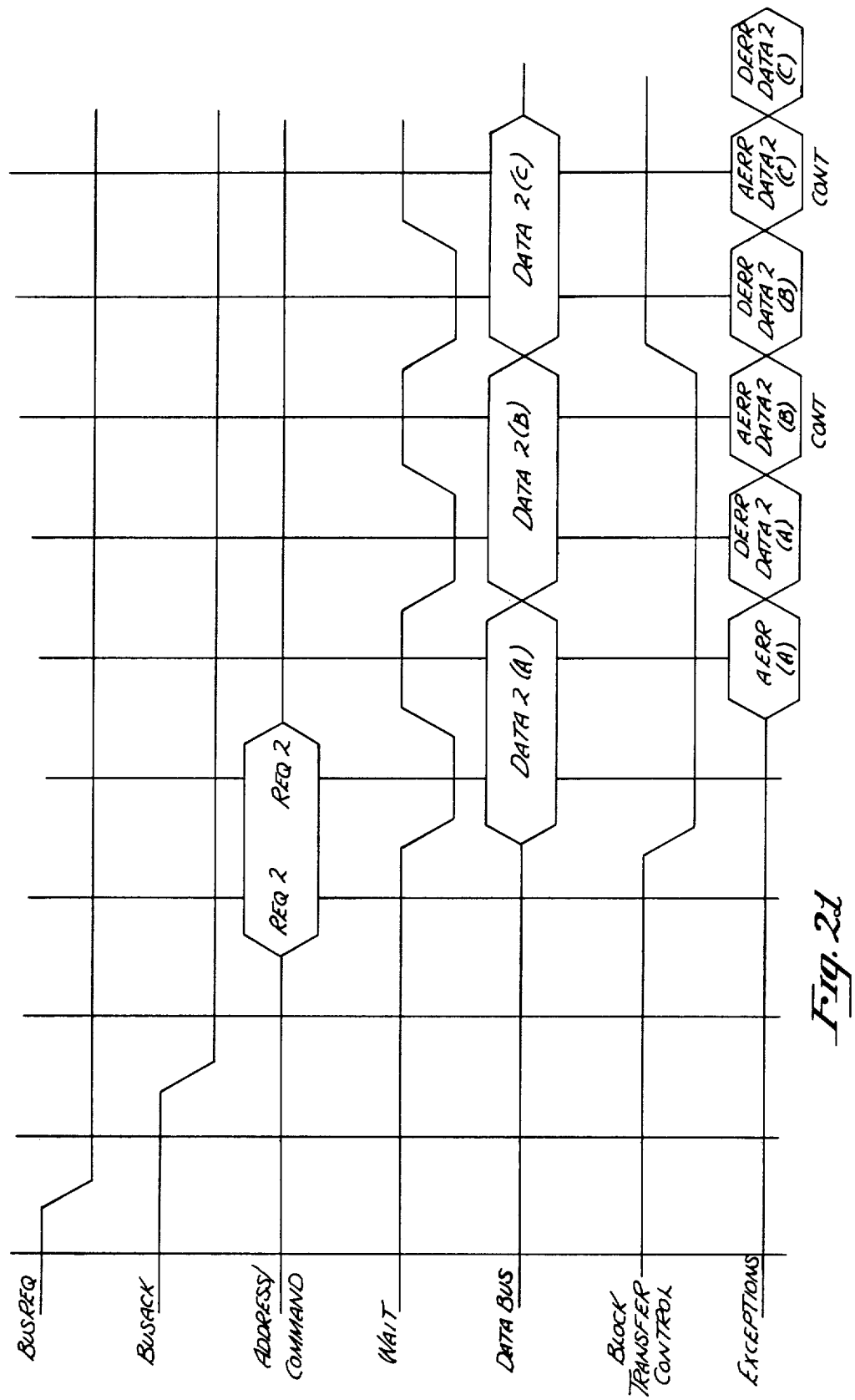
FIG. 21 is a timing diagram illustrating local bus block transfer and exception conditions.

FIGS. 18 and 21 illustrate the present invention's exception reporting protocol for requests, data, as well as "continuation" exceptions. As shown in FIG. 14, control lines 320 include address error (AERR) and data error (DERR) lines which are coupled between all agents on local bus 56. As previously described, exceptions to a request phase asserted by, for example, primary processor requesting agent 40, are reported to the requesting agent during the first data transfer period of the reply phase. Similarly, exceptions to data applied to data lines 315 are reported during the clock cycle immediately following the application of the data. In the present invention, continuation exceptions are reported on the address error signal line (AERR) to the requesting agent performing the bus operation, along the local bus. The AERR signal indicates that the data applied to the data bus is not being driven by the expected replying agent, and actually indicates that a continuation error [i.e., a physical boundary (overflow) error] has occurred. A continuation error may occur in the case of block transfers where the replying agent is incrementing the replier data address after each operation and exceeds the permissible address range of the replying agent. In such case, the repling agent indicates to the requesting agent that a continuation error has occurred by asserting the AERR line during the period when the requested data was to be valid. Thus, all continuation errors are reported concurrently with the clock cycle in which the data would otherwise be valid. Continuation errors may also be reported by a replying agent which does not support block transfers where a block transfer request has been made. If a WAIT signal has been asserted, this period would be delayed accordingly.

Figure 19:
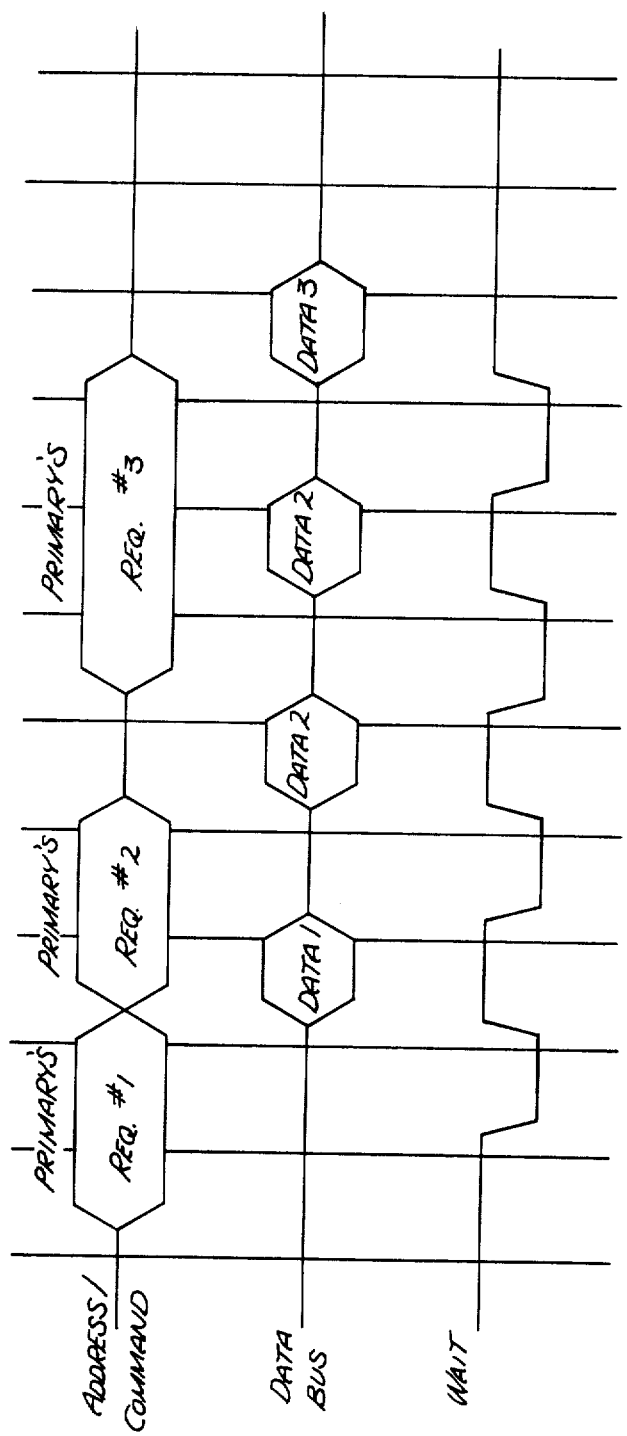
FIG. 19 is a timing diagram illustrating local bus arbitration, pipe-lining and WAIT where the local bus is active under the control of the primary requesting agent.

Referring now to FIG. 19, the ability of local bus 56 to "pipeline" by permitting the overlapping of a request phase of a given requesting agent's bus operation with the reply phase of its previous bus operation is disclosed. In the present example, the primary processor 40 drives its first request phase onto the address and command lines. The primary requesting agent (processor) 40 may initiate its second bus operation immediately after the current request phase is complete if the first bus operation is not a block transfer. If the first bus operation is a block transfer, the second bus operation's request phase may not be intiiated until the clock cycle during which the last data transfer period of the first bus operation is expected.

Figure 20:
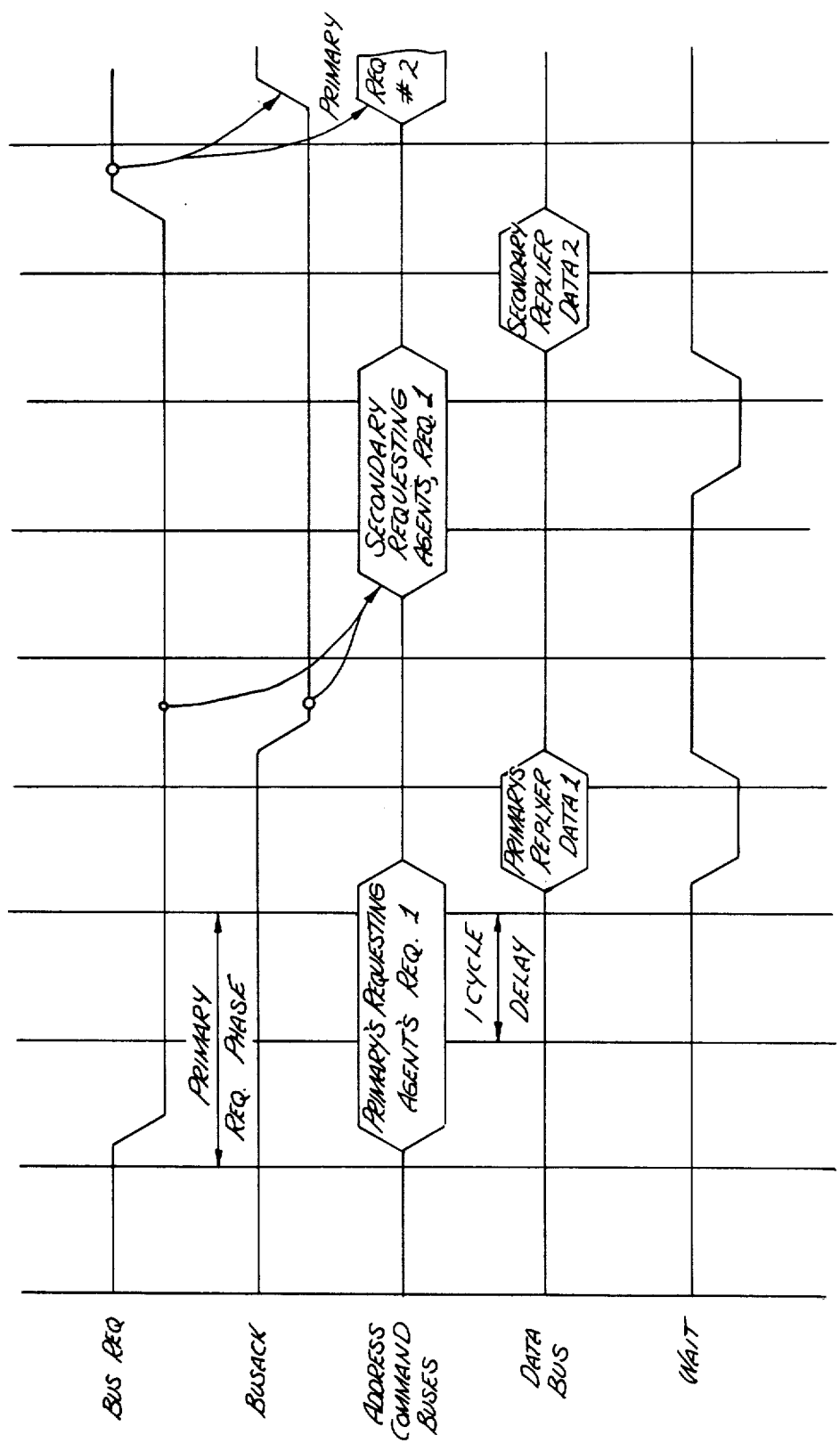
FIG. 20 is a timing diagram illustrating local bus arbitration and WAIT where the local bus is initially under the control of the primary requesting agent.

FIG. 20 illustrates the case where the primary requesting agent 40 has gained access to the local bus 56, and where the secondary requesting agent 57 requires bus access. As shown, secondary processor 57 asserts the BUS REQ line during the request phase of the primary requesting agent. The primary requesting agent is required not to release the local bus to the secondary requesting agent any earlier than the clock cycle following the end of its reply phase. As shown, the request phase of the secondary requesting agent 57 starts the clock cycle, following the clock cycle BUS ACK is asserted by the primary requesting agent 40.

FIG. 20 also illustrates the timing for the secondary requesting agent 57 releasing the lines to the primary 40 upon completion of its reply phase. As indicated, the earliest the secondary requesting agent can release the ownership of the bus back to the primary requesting agent is the clock cycle following the last clock cycle of its reply phase. This is achieved by the secondary requesting agent 57 deasserting its BUS REQ signal. In the following clock cycle, the primary requesting agent 40 must deassert the BUS ACK signal, and may start the request phase of a new bus operation.

In the example illustrated in FIG. 20, the replying agent 40 has asserted the WAIT signal during the first clock cycle of the secondary requesting agent's reply phase, thereby delaying the assertion of data for an additional clock cycle. The deassertion of the WAIT signal on the following cycle indicates that "read" data on the data lines is valid and must be accepted by the requesting agent. The WAIT signal is also used to inject the one clock delay in the reply phase of the secondary requesting agent's bus operation.

Figure 22:
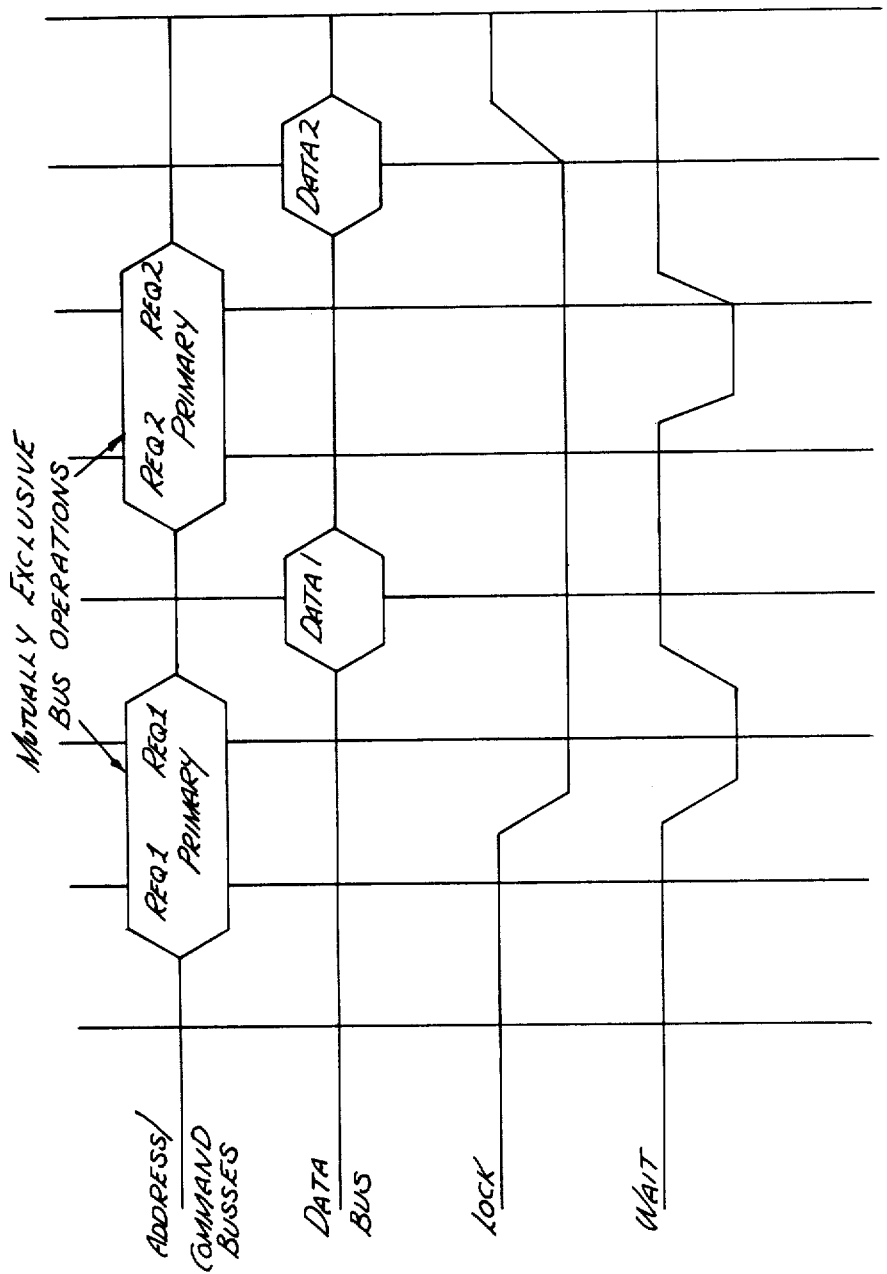
FIG. 22 is a timing diagram illustrating local bus mutually exclusive operations under a LOCK signal.

In addition to the WAIT control signal, local bus 56 incorporates other control lines such as LOCK which is a signal mechanism through which mutually exclusive bus opertions may be enforced. The LOCK signal is driven by a requesting agent and is received by all replying signals coupled to the local bus 56. The LOCK signal can be asserted by the requesting agent which has ownership of the bus at any given time. All replying agents must monitor the LOCk signal, and if they are included in the bus operation with LOCK asserted, they must lock any non-local bus ports, and remain locked until LOCK is deasserted. It is the responsibility of both the primary and secondary requesting agents not to release their ownership of the bus until its associated set of mutually exclusive bus operation is complete, and LOCK is deasserted. As shown in FIG. 22, the effect of the LOCK signal is to invoke a mutual exclusion condition which allows a given bus agent to perform a sequence of bus operations to a replying agent without permitting any other requesting agent to use that replying agent in the interim. More particularly, if the local bus 56 includes multi-ported replying agents, the mutual exclusion function requires a lock-out of all non-local bus ports.

Although FIGS. 15-22 have been described with reference to a primary or secondary agent accessing and receiving data from a memory resource 54 or the like, it will be appreciated that the same data transfer protocol may be used in the case where a requesting agent (processor) is writing data into a memory resource 54, processor or other data processing device. In the case of a write operation, the replying agent through the use of WAIT may interject pauses within the bus state, such that buffers may be allocated and the data received and checked for errors. The requesting agent driving data during a write operation must extend the driving of the data to the next clock cycle if WAIT is also asserted in that clock cycle (see FIG. 21).

SUMMARY

In accordance with the previous discussion, it will be apparent to one skilled in the art that the present invention provides a unique system data bus architecture and data transfer protocols not previously known in the prior art. The present invention's parallel bus 35 permits high speed transfers of large quantities of data between agents coupled to the bus, which by way of example may include data transfers between processing units, global memories, or other data processing devices. Similarly, the present invention's serial bus 37 permits efficient message transferring capability between agents within the bus structure thereby eliminating message passing traffic on the parallel bus 35. Moreover, local bus 56 provides a high speed, high band-width parallel bus for data transfer between a primary processor and a plurality of local resources without impacting the available band-width of other system buses.

Although the present invention has been illustrated using FIGS. 1–22, and with reference to particular data transfer examples, it will be appreciated by one skilled in the art that the present invention has utility far exceeding the relatively simple transfer examples discussed.

We claim:

1. A high speed synchronous local bus for transferring data between a plurality of data processing devices comprising:
    at least one requesting processor connected to said high speed synchronous local bus and operating at a first predetermined clocking rate;
    at least one replying processor connected to said high speed synchronous local bus;
    priority arbitration means whereby each of said at least one requesting processor is automatically assigned an arbitration number wherein priority arbitration can be modified based upon a desired hierarchy;
    high speed synchronous local bus address lines coupled to said at least one requesting processor and said at least one replying processor for transmitting address information therebetween;
    high speed synchronous local bus command lines coupled to said at least one requesting processor and said at least one replying processor for transmitting command data therebetween;
    high speed synchronous local bus data lines coupled to said at least one requesting processor and said at least one replying processor for transmitting data therebetween;
    high speed synchronous local bus control lines coupled to said at least one requesting processor and said at least one replying processor for transmitting control data therebetween;
    high speed synchronous local bus clock lines coupled to said at least one requesting processor and to said at least one replying processor and to other data processing devices connected to said high speed synchronous local bus, such that all events on the local bus are clocked at a percentage of the predetermined clocking rate of said at least one requesting processor;
    WAIT signal asserting/deasserting means coupled to said at least one replying processor for asserting and deasserting a WAIT signal on said high speed synchronous local bus control lines to data processing devices coupled to said high speed synchronous local bus;
    WAIT signal timing means for asserting said WAIT signal during a first clock cycle of application of address and command information by said requesting processor on said high speed synchronous local bus address and command lines respectively;
    WAIT driving means for driving said address and command information until said WAIT signal is deasserted by said replying processor;
    operations delaying means whereby the assertion of said WAIT signal after said first clock cycle of application of address and command information by said requesting processor results in a delay of all further high speed synchronous local bus operations except the completion of said application of address and command information by said requesting processor; and
    operations initiating means wherein said deassertion of said WAIT signal by said replying processor permits further local synchronous bus operations to occur on said high speed synchronous local bus in accordance with said desired priority hierarchy and beginning during a clock cycle of said requesting processor occurring at the time of deassertion such that data is transferred in accordance with requesting processor priority along said high speed synchronous local bus irrespective of differences in the speed of operation of said replying processor and said requesting processor.

2. The bus structure as defined by claim 25, wherein said requesting processor drives address and data information on said respective address and command lines for a minimum of two clock cycles absent the assertion of a WAIT signal during said first clock cycle by a replying data processing device.

3. The bus structure as defined by claim 1, further including a secondary processor coupled to said local bus;
    said secondary processor including bus request signal generation means for asserting a bus request signal (BUS REQ) to said requesting processor on a bus request line coupled to said requesting and secondary processors, the assertion of said BUS REQ signal denoting a request by said secondary processor to gain access to said local bus;
    said requesting processor including bus acknowledge signal generation means for asserting a bus acknowledge signal (BUS ACK) to said secondary processor on a bus acknowledge line coupled to said requesting and secondary processors, the assertion of said BUS ACK signal denoting a grant of bus access to said secondary processor by said requesting processor.

4. The bus structure as defined by claim 3, wherein the assertion of said BUS REQ and BUS ACK signals, and the absence of a WAIT signal permits said secondary processor to assert as a request address and command information on said address and command lines, respectively.

5. The bus structure as defined by claim 4, wherein said replying processor may complete a bus operation after first clock cycle.

6. The bus structure as defined by claim 5, wherein said replying data processor includes exception signal generating means for providing exception signals in response to said request during the first clock cycle in which said replying can respond to said request.

7. The bus structure as defined by claim 6, wherein said replying processor includes continuation exception signal generation means for providing continuation exception signals in response to a request by at a least one of a requesting and replying or secondary processor during the clock cycle in which valid data is to be applied to said data lines.

8. The bus structure as defined by claim 7, wherein said requesting and replying processors include LOCK signal generation means for providing a LOCK signal to at least one replying processor, said LOCK signal assertion requiring every replying processor to accept a request only from a requesting processor until said LOCK signal is deasserted.

9. A method for transferring data on a high speed syncrhonous local bus, comprising the steps of:
arbitrating between a plurality of requesting processors which of said requesting processors can have control of said high speed synchronous local bus;
generating a signal representing an address of a replying processor to one of said requesting processors on address lines coupled between said requesting processors and a replying processor;
generating clock signals synchronous with an internal clock of said requesting processor and applying said clock signal or a percentage of said clock signal to a clock line of said high speed synchronous local bus such that all local bus operations are timed as integer multiples of the internal clock signals of said requesting processor;
replying to said transmitted command and address by said replying processor;
asserting a WAIT signal by said replying processor when an internal clock speed of said replying processor differs from a clock speed of said high speed synchronous local bus;
monitoring a WAIT line coupled between said requesting processor and said replying processor;
applying said address and data information by said requesting processor until said WAIT is asserted by said replying processor;
delaying all further bus operations except for completion of the application of said address and data information to said replying processor;
deasserting said WAIT signal by said replying processor on transmission of information accessed in response to said command and said data request; and
resuming all operations on said bus in response to said deassertion of said WAIT signal.

10. The method as defined by claim 9, wherein said step of applying said address and data information by said requesting processor occurs for a minimum of two clock cycles absent the assertion of a WAIT signal during a first clock cycle of said application step.

11. The method as defined by claim 10, wherein said replying step may occur after the first clock cycle of said application.

12. The method as defined by claim 11, wherein said replying data processor generates exception signals denoting errors in applied address and data information by a requesting processor during the first clock cycle in which said replying data processor may respond to said primary processor.

13. The method as defined by claim 12, further including a secondary processor coupled to said local bus;
said secondary processor including bus request signal generation means for asserting a bus request signal (BUS REQ) to said requesting processor on a bus request line coupled to said requesting and secondary processors, the assertion of said BUS REQ signal denoting a request by said secondary processor to gain access to said local bus;
said requesting processor including bus acknowledge signal generation means for asserting a bus acknowledge signal (BUS ACK) to said secondary processor on a bus acknowledge line coupled to said requesting and secondary processors, the assertion of said BUS ACK signal denoting a grant of bus access to said secondary processor by said requesting processor.

14. The method as defined by claim 13, wherein the assertion of said BUS REQ and BUS ACK signals, and the absence of a WAIT signal permits said secondary processor to assert address and command information on said address and command lines, respectively.

15. The method as defined by claim 14, wherein said replying data processing device generates continuation exception signals denoting an address error in response to the generation of said address and command information by a processing during the clock cycle in which valid data is to be applied to said data lines.

16. The method as defined by claim 15, wherein said processors may generate a LOCK signal and transmit said LOCK signal to at least one replying data processing device, said LOCK signal requiring said replying data processing device to accept only address, command and data information from said requesting processor applying said information to said local bus until said LOCK signal is deasserted.

* * * * *